US009123189B2

(12) United States Patent
Kollgaard et al.

(10) Patent No.: US 9,123,189 B2
(45) Date of Patent: *Sep. 1, 2015

(54) SYSTEM AND METHOD FOR POINT-OF-USE INSTRUCTION

(75) Inventors: Jeffrey R Kollgaard, Kent, WA (US); Joseph Frank Floyd, University Place, WA (US); John Robert Linn, Maple Valley, WA (US); Brent Louis Hadley, Kent, WA (US)

(73) Assignee: The Boeing Company, Chicago, IL (US)

( * ) Notice: Subject to any disclaimer, the term of this patent is extended or adjusted under 35 U.S.C. 154(b) by 728 days.

This patent is subject to a terminal disclaimer.

(21) Appl. No.: 12/191,167

(22) Filed: Aug. 13, 2008

(65) Prior Publication Data

US 2008/0301152 A1 Dec. 4, 2008

Related U.S. Application Data

(63) Continuation-in-part of application No. 11/673,685, filed on Feb. 12, 2007, now Pat. No. 8,825,498.

(51) Int. Cl.

| | |
|---|---|
| ***G06F 17/30*** | (2006.01) |
| ***G06F 7/00*** | (2006.01) |
| ***G07C 5/08*** | (2006.01) |
| ***G06Q 50/00*** | (2012.01) |
| ***G07C 5/00*** | (2006.01) |

(52) U.S. Cl.

CPC .............. *G07C 5/0808* (2013.01); *G06Q 50/00* (2013.01); *G07C 5/008* (2013.01); *G07C 2205/02* (2013.01)

(58) Field of Classification Search

CPC ............ G06F 17/3002; G06F 17/3005; G06F 17/30283; G06F 17/30067; G01S 13/00; G06Q 10/06; G06Q 50/30; G06Q 30/0267

USPC .................................................. 707/621, 691

See application file for complete search history.

(56) References Cited

U.S. PATENT DOCUMENTS

| | | | | |
|---|---|---|---|---|
| 5,187,797 | A * | 2/1993 | Nielsen et al. | 715/708 |
| 5,201,067 | A * | 4/1993 | Grube et al. | 455/556.1 |
| 5,404,436 | A * | 4/1995 | Hamilton | 345/472 |
| 5,421,018 | A * | 5/1995 | Hiyama | 713/300 |
| 5,437,053 | A * | 7/1995 | Sawa et al. | 455/551 |
| 5,440,637 | A * | 8/1995 | VanFleet | 381/1 |
| 5,765,212 | A * | 6/1998 | Yamada | 711/213 |
| 6,133,905 | A * | 10/2000 | Edo et al. | 345/156 |
| 6,181,992 | B1 * | 1/2001 | Gurne et al. | 701/31.4 |

(Continued)

OTHER PUBLICATIONS

U.S. Appl. No. 11/673,685, filed Feb. 12, 2007, Jeffrey Kollgaard et al.

(Continued)

*Primary Examiner* — Daniel Kuddus

(74) *Attorney, Agent, or Firm* — Haynes and Boone, LLP

(57) ABSTRACT

In accordance with one or more embodiments of the present disclosure, systems and methods for transferring data over a network include communicating with a user via a portable communication device over the network, receiving a request for at least one instruction sequence related to a particular repair task of a machine from the user via the portable communication device over the network, processing the request from the user by accessing and retrieving the at least one instruction sequence from a database component, and transferring the at least one instruction sequence from the database component to the portable communication device.

20 Claims, 19 Drawing Sheets

(56) References Cited

U.S. PATENT DOCUMENTS

| | | | | |
|---|---|---|---|---|
| 6,219,021 | B1 * | 4/2001 | Izumi | 345/102 |
| 6,397,131 | B1 * | 5/2002 | Busch et al. | 701/31.6 |
| 6,549,820 | B1 * | 4/2003 | Barrett et al. | 700/110 |
| 6,574,537 | B2 | 6/2003 | Kipersztok et al. | |
| 6,876,950 | B2 * | 4/2005 | Beney et al. | 702/183 |
| 6,898,492 | B2 * | 5/2005 | de Leon et al. | 701/32.4 |
| 6,901,318 | B1 * | 5/2005 | Morronigiello et al. | 701/29.4 |
| 7,222,514 | B2 | 5/2007 | Kollgaard et al. | |
| 7,254,519 | B2 * | 8/2007 | Fetzer | 702/183 |
| 7,275,049 | B2 | 9/2007 | Clausner et al. | |
| 2002/0138184 | A1 * | 9/2002 | Kipersztok et al. | 701/29 |
| 2003/0110503 | A1 * | 6/2003 | Perkes | 725/86 |
| 2003/0204332 | A1 * | 10/2003 | Beney et al. | 702/34 |
| 2004/0199307 | A1 * | 10/2004 | Kipersztok et al. | 701/29 |
| 2007/0084290 | A1 | 4/2007 | Fetzer | |
| 2008/0109187 | A1 | 5/2008 | Kollgaard et al. | |
| 2008/0150342 | A1 | 6/2008 | Kismarton | |
| 2008/0156096 | A1 | 7/2008 | Kollgaard | |

OTHER PUBLICATIONS

U.S. Appl. No. 12/118,037, filed May 9, 2007, Brent Hadley et al.

U.S. Appl. No. 12/118,055, filed May 9, 2007, Brent Hadley et al.

* cited by examiner

Key To

SYSTEM AND METHOD FOR POINT-OF-USE INSTRUCTION

CROSS-REFERENCE TO RELATED APPLICATIONS

This application is a continuation-in-part to U.S. patent application Ser. No. 11/673,685, entitled "Ramp Recorder and Quick Reporting Tree Data Transmission Method", filed Feb. 12, 2007, which is incorporated herein by reference in its entirety.

TECHNICAL FIELD

The present disclosure relates generally to data retrieval and, more particularly, to point-of-use instruction via ultra-portable devices.

BACKGROUND

Currently, there is no standardized method for conveying information about aircraft damage and/or malfunction to a centralized decision-making center in a manner efficient enough to enable quick dispatch or grounding-for-repair of an aircraft. Moreover, the methods in use today involve a combination of modes with much of the important data manually typed or verbally communicated. These methods of communication do not allow the information to be stored in a format that adequately captures history and allows forecasting. For example, a verbal telephone repot or an e-mail description can not be efficiently incorporated into a spreadsheet or relational database, or quantified, without a labor-intensive "translation" process by a human operator.

Certain operations on an airplane, though relatively simple, are highly critical and demand skilled workmanship. In heavy maintenance situations, where time is not as critical, individuals with a high skill level can be summoned and/or documents that describe how to do the operation can be reference on nearby computers. The situation is different for an aircraft in line maintenance or at an airport a loading gate. In these situations, it is often not possible to summon individuals with the needed training to the scene, nor is it possible for mechanics to quickly access guidance and/or instructions that describe how to properly perform the operation.

As such, some existing solutions for accessing guidance and/or instructions may require the user to obtain formal training before undertaking the operation and rely on this memorized training even though months or years may have passed. Other solutions may require a user to consult a manual, either via a communication network or in paper form, that is usually available only in central locations and not at the point-of-use.

Some guidance and/or instructions may be delivered to an airplane mechanic at a remote area with a wireless network connection, e.g., Wi-Fi connection. However, wireless capability for networked computers is not always present in remote areas. When present, it is rarely adequate to transmit high-bandwidth data and information, such as photo and video content. Accordingly, conventional solutions that rely on conventional wireless network connections suffer from inconsistent or non-existent wireless coverage in locations where point-of-use instructions are needed.

As a result, there is a need for a standardized, efficient system and method for transmitting data on damage and malfunctions of aircraft structures and systems for rapid decision-making and accumulation of statistical data for analyzing, identifying and forecasting damage trends for quality control and product improvement.

SUMMARY

Systems and methods disclosed herein, in accordance with one or more embodiments of the present disclosure, involves a service application downloadable to an ultra-portable device (e.g., a cell phone or personal digital assistant (PDA)) that is adapted to guide a user through a task using interactive instructions. Various processes may be performed with point-of-use guidance using the ultra-portable device to deliver sequential instructions with accompanying videos, graphics, and/or illustrations.

In one implementation, the service application guides the user through a task with a step-by-step instruction sequence. For example, instructions may be provided directly to a user having the ultra-portable device. In some situations, the user may not be skilled in the task at a particular location (e.g., remote location) where the work needs to be performed, and thus, the step-by-step instruction sequence provides guidance to the user.

In another implementation, the service application serves as a point-of-use guide or coach to demonstrate proper service techniques. The service application enables service to be performed in an uninterrupted manner on site without excursions to retrieve information stored in other locations. The service application also enables non-specialized personnel to be coached or trained on the spot to perform tasks above their skill level.

In accordance with one embodiment, a system for transferring data over a network comprises a database component for storing one or more instruction sequences for a plurality of tasks related to repairing a machine, a communication component adapted to communicate with a user via a portable communication device over the network, and a processing component adapted to receive a request for at least one instruction sequence related to a particular repair task of the machine from the user via the portable communication device over the network and process the request from the user by accessing and retrieving the at least one instruction sequence from the database component. The communication component is adapted to transfer the at least one instruction sequence from the database component to the portable communication device for viewing by the user.

In one implementation, the portable communication device may comprise at least one of a cell phone and personal digital assistant (PDA), and the network may comprise a cellular phone network. The at least one instruction sequence may be displayed to the user on a display component of the portable communication device. The at least one instruction sequence may comprise step-by-step guidance through each instruction in the instruction sequence. The portable communication device may comprise a portable database component for storage of the at least one instruction sequence. The portable communication device may comprise a user input component that receives input from the user including data and information related to the at least one instruction sequence. The machine comprises an airplane, and the system comprises a server.

In accordance with one embodiment, a method for transferring data over a network comprises communicating with a user via a portable communication device over the network, receiving a request for at least one instruction sequence related to a particular repair task of a machine from the user via the portable communication device over the network, processing the request from the user by accessing and retrieving the at least one instruction sequence from a database component, and transferring the at least one instruction sequence from the database component to the portable communication device.

In one implementation, the method may comprise conducting an automated query and response session with the user via the portable communication device. The method may comprise receiving and analyzing data related to at least one of damage and malfunction of the machine. The method may comprise preparing a damage report for the user based on the query and response session and deciding whether the machine is ready for use or repair based on the damage report. In one aspect, deciding whether the machine is ready for use or repair based on the damage report includes one or more of deciding to make minor repairs and dispatch the machine, deciding to remove the machine from service for major repair, and deciding to dispatch the machine without repair.

The scope of the invention is defined by the claims, which are incorporated into this section by reference. A more complete understanding will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1A:
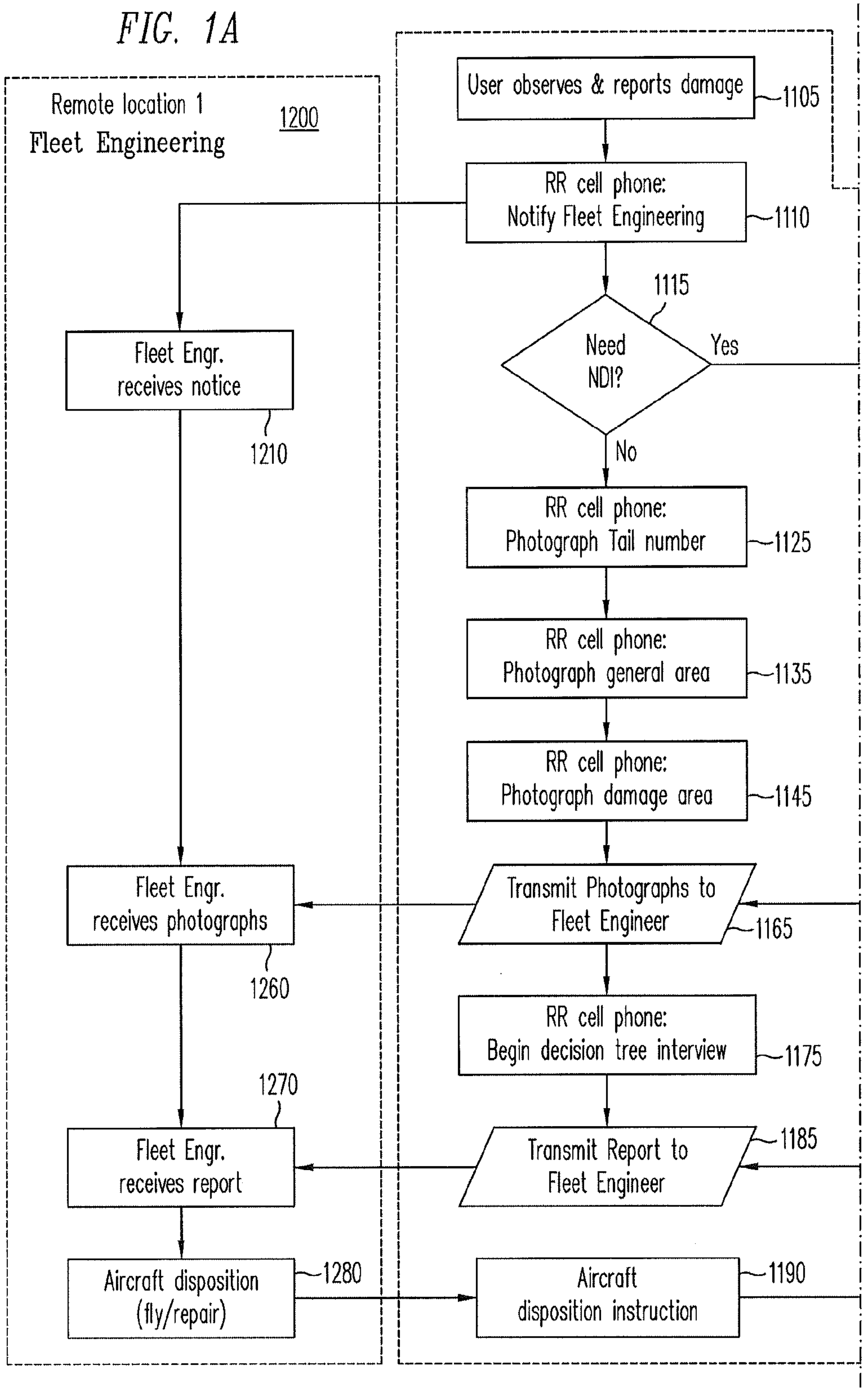
FIG. 1 shows a block diagram of a method of reporting, recording, assessment, and disposition of damage and malfunction incidents, in accordance with one or more embodiments of the present disclosure.
Figure 1B:
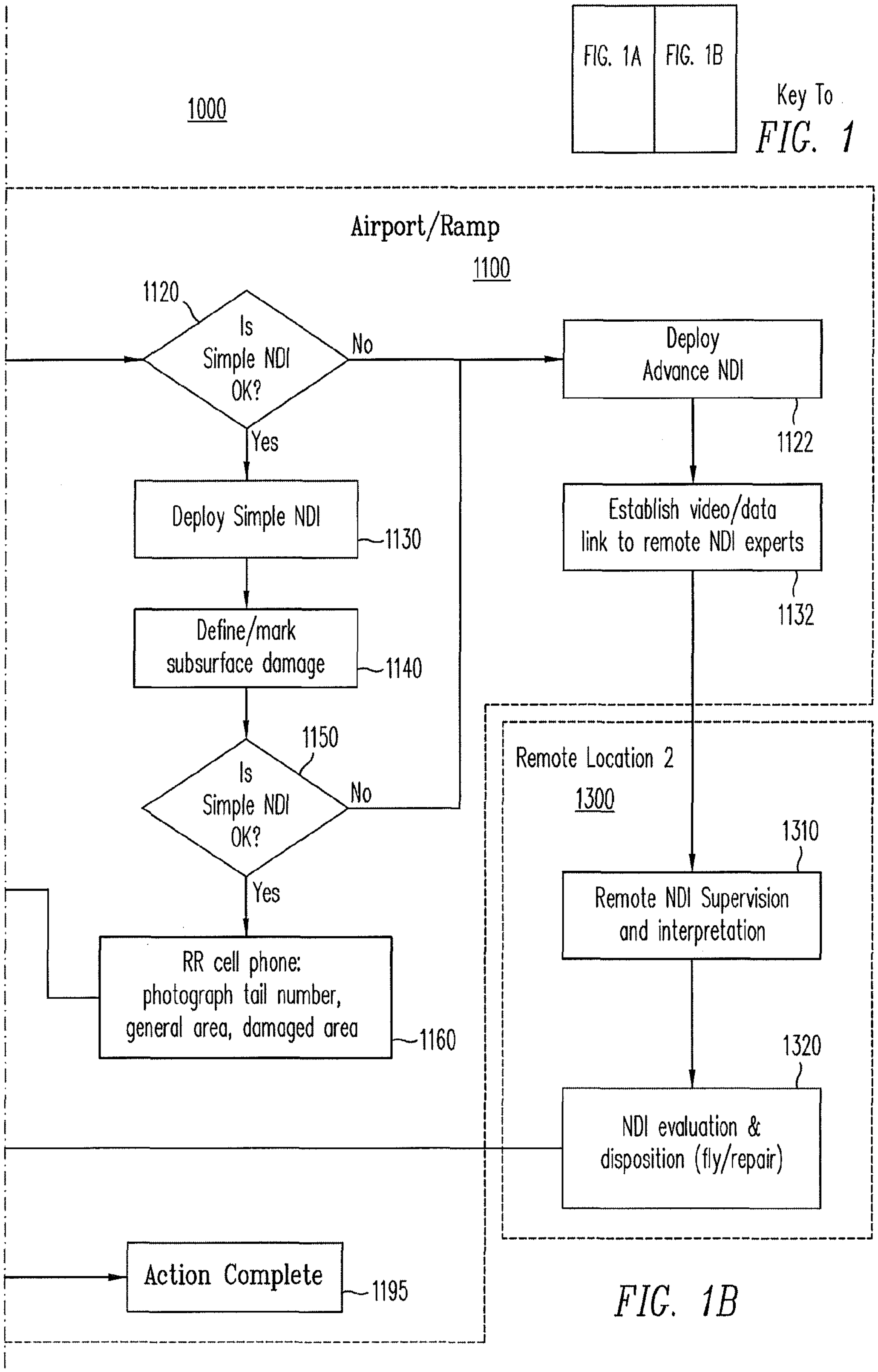

FIG. 1 shows an exemplary method in accordance with one embodiment of the procedures that may be included in a quick reporting decision tree data transmission system 1000. A user, who may be personnel working in the airport ramp area (block 1100) around the aircraft during the boarding, servicing and loading activities, observes an incidence of damage or malfunction (block 1105). The user accesses a rapid reporting communications device, such as a cell phone (e.g., RR cell phone) to communicate the observation (block 1110) to Fleet Engineering at Remote Location 1 (block 1200). Specifically, a supervisory person, such as a Fleet Engineer, receives notice of the observed incident (block 1210). If the incident relates to damage of a composite structure of the aircraft, the method proceeds as illustrated in FIG. 1. Similar quick reporting decision tree data transmission systems may be described for procedures that relate, for example, to non-composite damage or electrical or mechanical malfunctions. In this embodiment, the method will be described with respect to treatment of composite damage.

A discussion between the ramp area personnel and Fleet Engineer (via block 1110 and block 1210) is held using the rapid reporting communications device. This results in a decision whether some measure of nondestructive inspection (NDI) is required (block 1115). If the determination is such that the incident is of a minor nature as to not require NDI (e.g., a NO decision in block 1115 for a surface scratch) a routine documentation is captured as follows: The RR cell phone is equipped with image acquisition and transmission capability, as, for example, a cell phone with a digital camera. For recordkeeping, the ramp personnel photographs specific areas of the aircraft with the RR cell phone, such as the tail number (block 1125) for identification, the general damage area (block 1135), and any further detailed images (block 1145). The ramp area personnel transmits the images via the RR cell phone (block 1165) to the Fleet Engineer, who receives and evaluates them (block 1260).

The ramp personnel may, at this time, initiate a decision tree interview (block 1175) with the Quick Reporting Tree system (to be described below) in which an automated process of directed questions, based on responses from the ramp personnel, obtains information at finer levels of granularity for evaluating the damage and suggesting disposition actions.

For the current case, in which the damage is determined to be of a very minor nature, or easily resolved, the Quick Reporting Tree system returns a report which is transmitted to ramp personnel and Fleet Engineering (block 1185). The Fleet Engineer receives the report ((block 1270) and, after evaluating all evidence in hand, makes a decision (block 1280) as to whether the aircraft can fly (i.e., depart) or is in need of some level of repair. Aircraft Disposition Instructions (block 1190) are received at the ramp/boarding area, pursuant to the Aircraft Disposition decision (block 1280) issued by the Flight Engineer. At this point, the rapid assessment and dispatch/repair decision making process is considered finished, and the Action Complete (block 1195).

In the case where consultation between ramp personnel and Fleet Engineering (via blocks 1110 and 1210) determines that NDI measures are required (a YES decision in block 1115), the next decision concerns whether a simple category of pass/fail NDI tests may be sufficient (block 1120). If the decision is positive (i.e., YES), then one or more simple NDI tests instruments are deployed (block 1130) by ramp personnel. Using the simple NDI test instruments, the ramp personnel attempts to determine if subsurface damage exists. (block 1140). An evaluation of the simple NDI tests (block 1150) determines whether the tests are sufficient to assess whether the potential for subsurface composite damage has been adequately assessed. If the NDI test produces satisfactory results (i.e., OK) and damage is limited or cosmetic (i.e., a YES), at this point the ramp personnel may acquire, via the RR cell phone camera (block 1160) identifying information, including images of the aircraft tail number, general area of the aircraft, and damaged area. The personnel will then transmit the imagery to the Fleet Engineer (block 1165), who receives and evaluates the imagery and information (block 1260) as above. The assessment process then continues as previously described from this point onward.

In the case where simple NDI tests produce unclear or unsatisfactory results (as determined at either block 1120 or 1150) the decision is made to deploy extensive and quantitative Advanced NDI (block 1122). This procedure may require, for example, establishing a video and data link ((block 1132) between advanced NDI equipment at the ramp location and an expert located at a Remote Location 2 who is trained to evaluate NDI imagery and data and, for practical reasons of resource allocation, may not be available at every possible boarding/ramp location.

Data and imagery may then be transmitted to Remote Location 2 (block 1300), where the NDI expert remotely supervises and interprets NDI data (block 1310). The expert evaluates the NDI data and imagery and prepares a damage report (block 1320). That report is transmitted to personnel at the Airport/Ramp location (block 1100) to provide documentation to Fleet Engineering (block 1270 via block 1185) for Aircraft Disposition (block 1280) and Airport Disposition Instructions (block 1190), and is also entered and recorded in the Quick Reporting Tree system as coded data, to be described below. The Quick Reporting Tree system provides a comprehensive report, including the NDI report, which are both received (block 1270), as above, by Aircraft Disposition decision (block 1280) at Remote Location 1 (block 1200) and forwarding of Aircraft Disposition Instructions (block 1190) to Airport/Ramp (block 1100). These steps conclude the interview and assessment with Action Complete (block 1195). Similar flowcharts may be constructed to describe methods of responding to damage to non-composite structures, mechanical or electrical malfunctions, all of which are contemplated as embodiments.

Figure 2A:
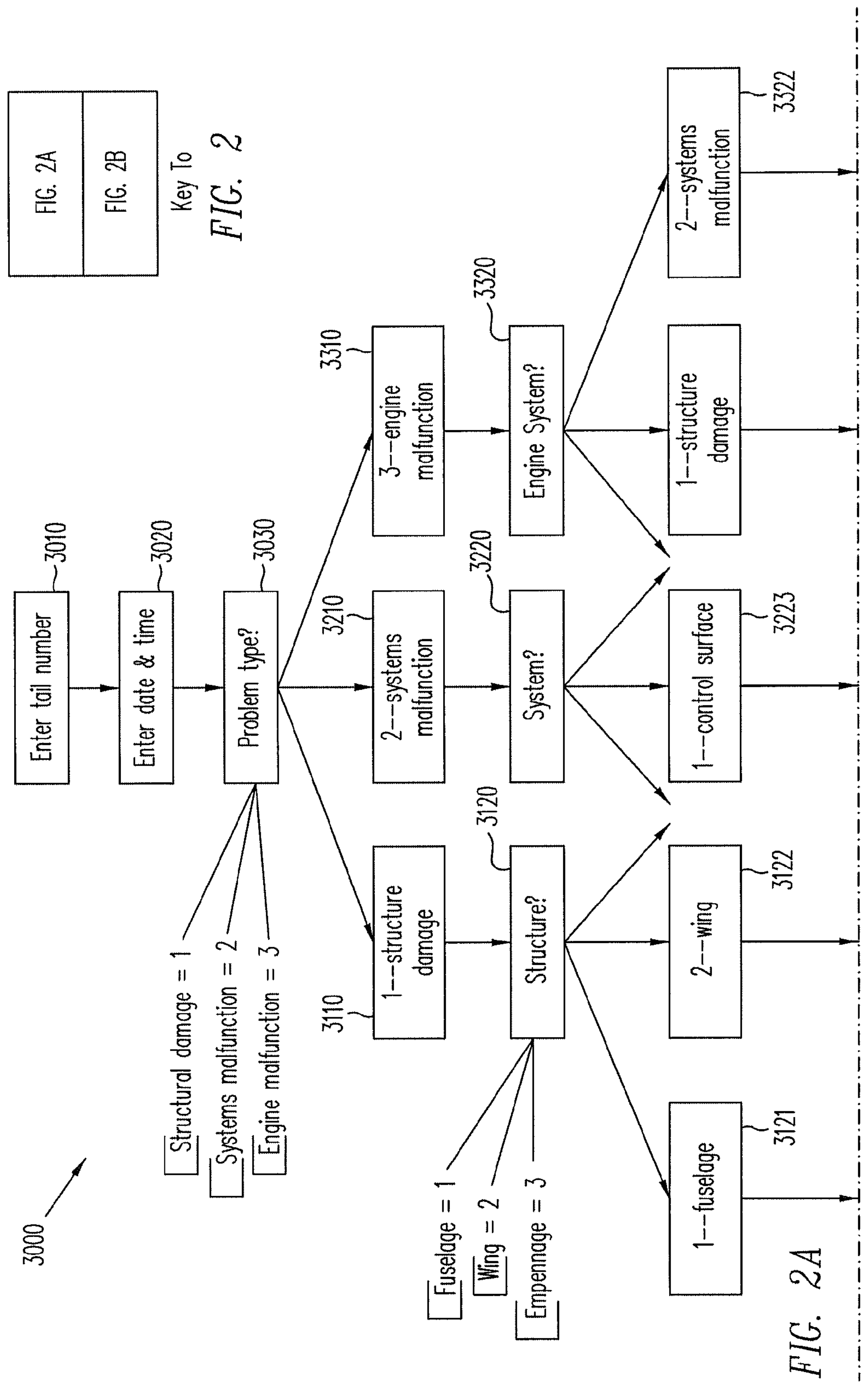
FIG. 2 shows a block diagram of a method of interview and data entry in a decision tree, in accordance with one or more embodiments of the present disclosure.
Figure 2B:
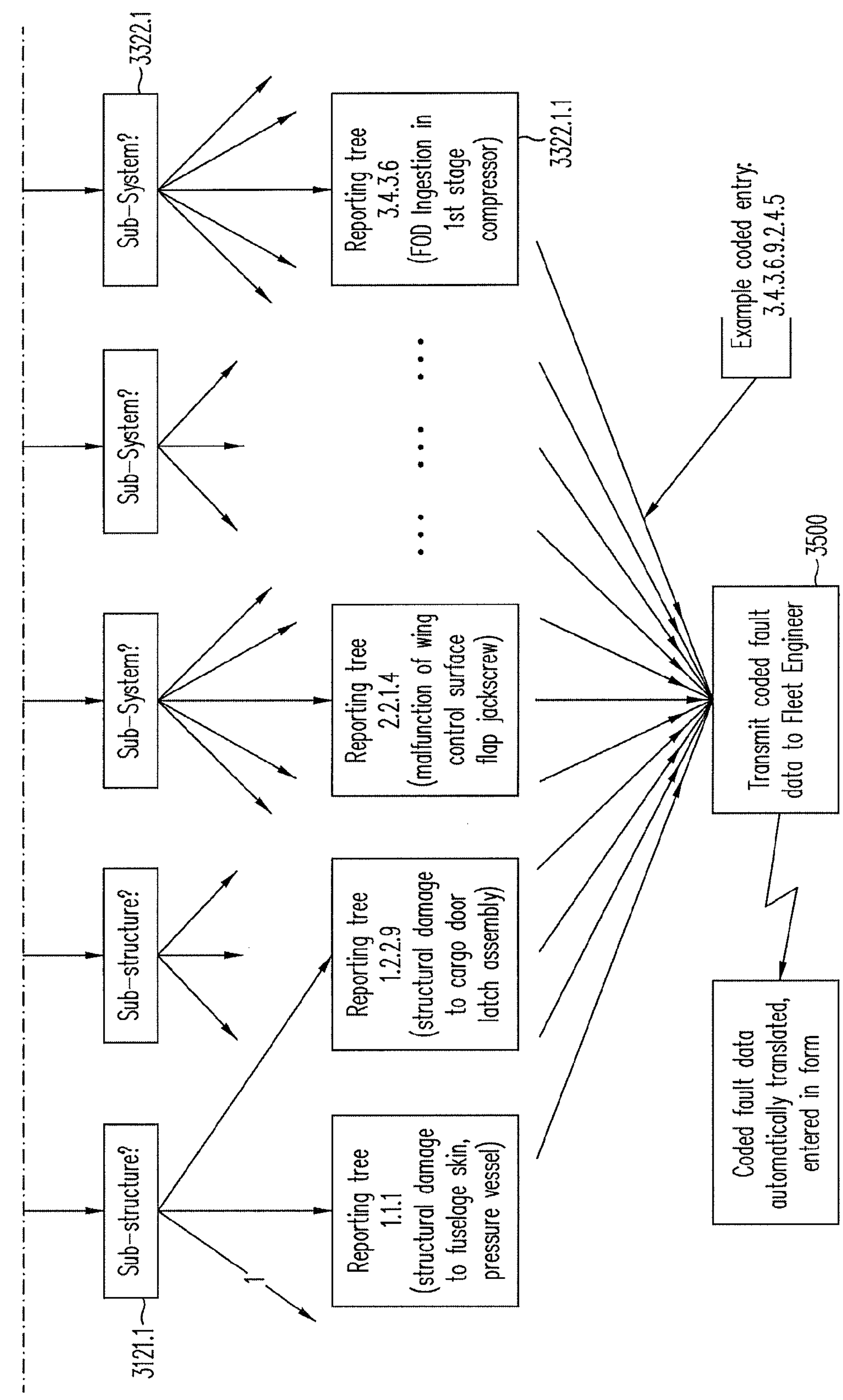

When a Decision Tree Interview is initiated, a series of questions are generated by a Quick Reporting Tree system operating from a remotely located computer, in contact with ramp personnel via, for example, the RR cell phone. FIG. 2 is an exemplary illustration of how the interview process may proceed.

Upon contacting the Quick Reporting Tree system 3000 by RR cell phone, the first instruction that may appear on the user's screen (or by audio instruction) may be a request to Enter tail number (block 3010) (which may also include a request for an image). After entry and transmission of this data via keypad, for example, the next request may be to Enter date, time and location (block 3020). The next request inquires about the general nature of the problem. Problem type? (block 3030) may list, for example, choices such as Structural damage=1, Systems malfunction=2, Engine malfunction=3, etc., whereupon the user makes a simple numeric entry. Selection from among the multiple choices available result in navigation through one of the branches of the selection tree. For example, if the damage is structural, the entry would be "1" on the keypad. This would lead to another branch point, Structure? (block 3120) with choices for sections of the aircraft (such as Fuselage=1, Wing=2, Empennage=3, etc.). If the damage is to the fuselage, the user may enter "1," which then triggers an inquiry from Fuselage (block 3121) called Sub-structure? (block 3121.1) to identify which sub-structure of the fuselage is involved (e.g., skin, pressure vessel, cargo door, etc.). A code is built as each branch point is queried. Using the example above, Structural damage (1), fuselage (1), sub-structure fuselage skin/pressure vessel (1) would be assigned a reporting tree code that may read, for example, as "1.1.1". The code is amended as finer granularity of detail is developed from the Decision Tree Interview.

Another example of a result from a Decision Tree Interview might occur in response to an engine malfunction and damage due to foreign object debris (FOD) ingestion in the 1st stage compressor. This might be assigned a code, for example, of "3.4.3.6".

At a point appropriate to the specific problem, the code may be further amended with recommendations or instructions for remediation of the problem. This may result in a longer code with additional numerical components. For example, in the FOD ingestion engine malfunction, the amended code may look like "3.4.3.6.9.2.4.6", which encodes repair instructions, and removal of the aircraft from service, if necessary, in addition to the evidentiary record upon which the recommendations are based. The coded fault data is then Transmitted (block 3500 and 1185) to the Airport/Ramp (block 1100) for receipt by the ramp area user and to Fleet Engineer (received in block 1270). The coded fault data received by Fleet Engineer (block 1270) is translated automatically for entry in an Aircraft Disposition form (in block 1280), which is effectively a code translated report of damage/malfunction assessment and may include recommendations. Fleet Engineer then issues to ramp personnel Aircraft Disposition Instructions (block 1190), at which point the Decision Tree Interview is concluded (Action Complete—block 1195).

Figure 3:
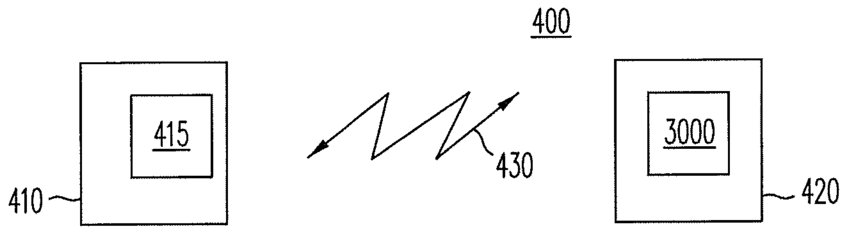
FIG. 3 shows a block diagram of a system for reporting, recording assessing and disposition of aircraft damage and malfunction incidents, in accordance with one or more embodiments of the present disclosure.

An exemplary illustration of a system for reporting, recording assessing and disposition of aircraft damage and malfunction incidents is shown in FIG. 3. The system 400 may be a communication device equipped with still and/or video imaging capability, such as a wireless cell phone 410 with a digital camera 415, in communication with a remote computer server 420, on which the Quick Reporting Tree system 3000 is operating. Both the cell phone 410 and the server 420 are coupled via a communications network 430.

In addition to enabling rapid assessment for repair vs. dispatch decisions concerning aircraft, Quick Reporting Tree system 3000 provides a means for the archival acquisition of damage and malfunction histories that may be analyzed across aircraft fleets, airline carriers, airport service facilities, components, component suppliers and a myriad of other relational criteria to build statistical databases helpful, for example, to observe trends, identify potential causal effects, improve safety, products and processes, control operating production costs for manufacturers or operating costs for carriers. This process may be carried out in a decision tree structure like Quick Reporting Tree 3000 that accesses a relational database of the information acquired from many accumulated incidents, using various software methods of data mining.

Figure 4:
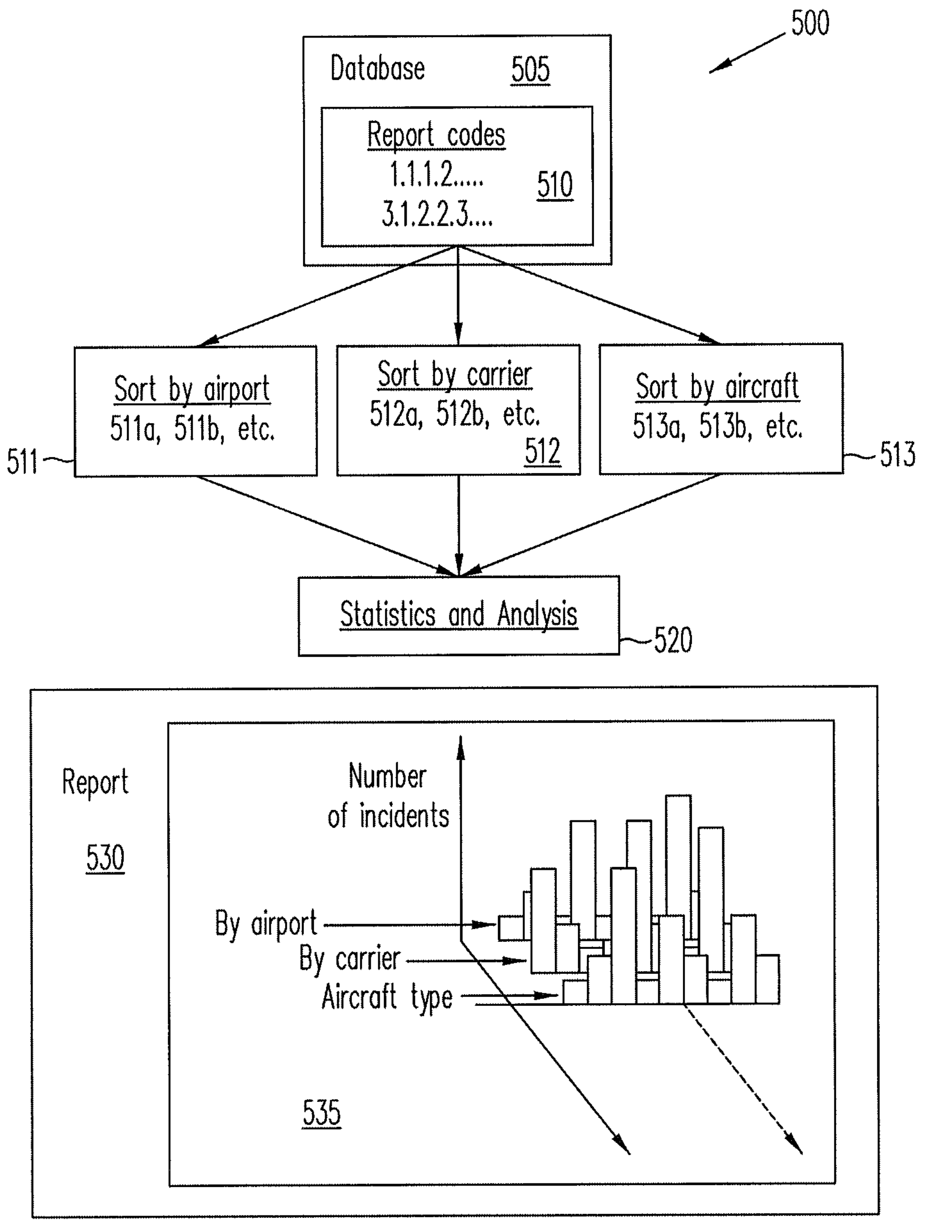
FIG. 4 shows block diagram of a method of deriving statistical trends in damage and malfunction incidents, in accordance with one or more embodiments of the present disclosure.

FIG. 4 is a flowchart illustrating a method of deriving statistical trends in damage and malfunction incidents for Analysis and Forecasting 500, in accordance with an embodiment.

Report codes (block 510) may be retrieved from a stored database (505) and sorted according to any required criteria. For example, If the incidence of cargo door damage during loading is sorted by airport (block 511), a histogram may be generated for all airports (e.g., 511*a*, 511*b*, etc.), for all carriers (block 512) or a subset of carriers (e.g., 512*a*, 512*b*, etc.), for one or more types of aircraft (block 513) (e.g., commuter (513*a*), medium-range (513*b*), jumbo (513*c*), etc.). Many different statistical analysis methods (block 520) may be employed, which may also include correlation analysis between categories to search for behavioral trends, which are all within the spirit of the embodiment. The results of the analysis and forecasting may be presented in a Report (block 530), which may include presentation of data, for example, in histogram form (block 535) or other forms or representation graphically, in tables and in narrative description of information.

Report (block 530) may provide information to identify relationships between damage/malfunction types and rate of occurrences and correlation to conditions that predispose such occurrences. This may help to indicate areas such as procedures, design modification, or training that could beneficially reduce the number of such occurrences, reducing airline carrier costs, delays, inconveniences and supplier warranty costs.

New Material . . .

Figure 5:
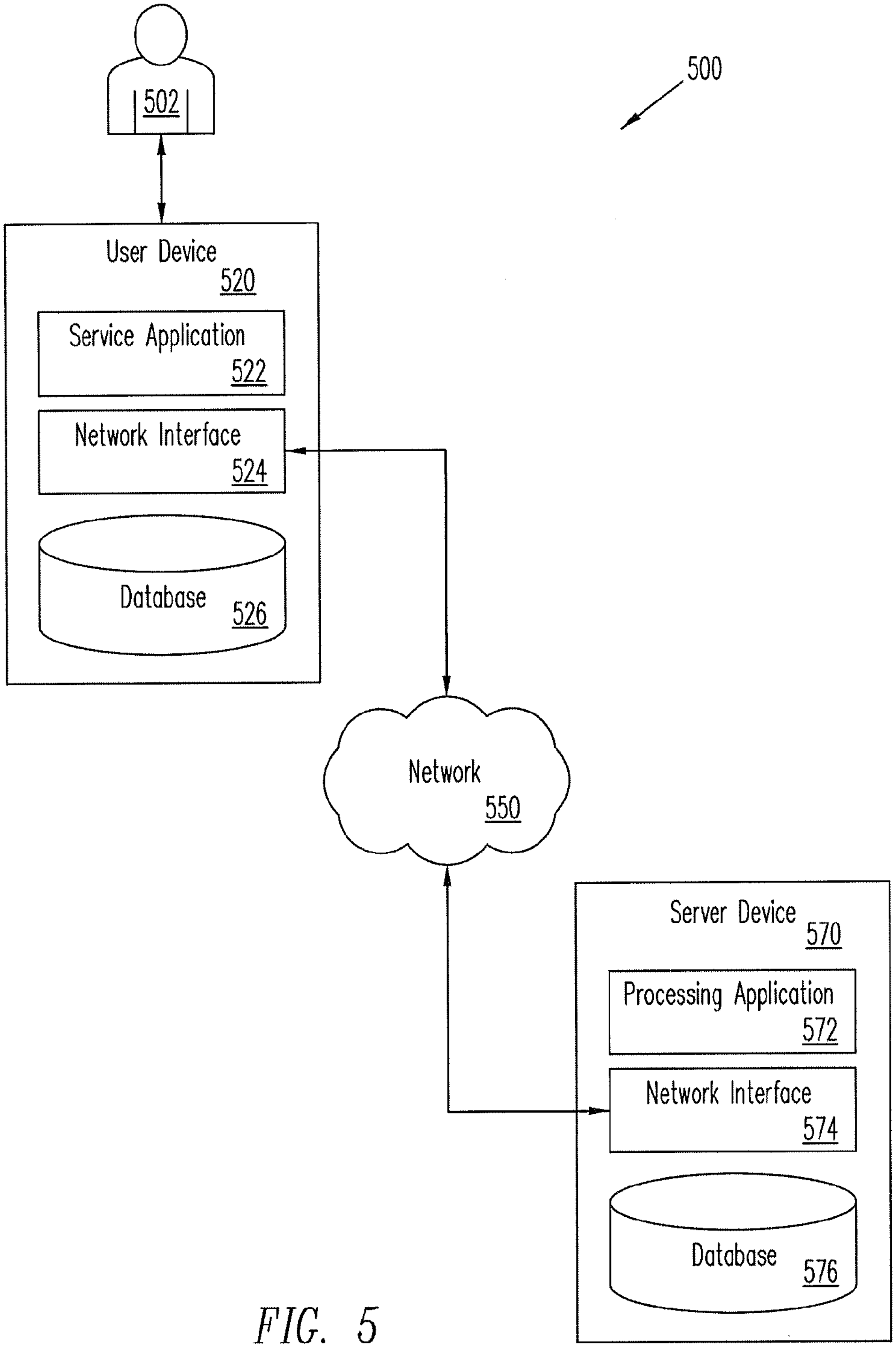
FIG. 5 shows a block diagram of a system configured to transfer data and information over a network, in accordance with one or more embodiments of the present disclosure.

FIG. 5 shows one embodiment of a block diagram of a system 500 configured to transfer data and information over a network 550. As shown in FIG. 5, the system 500 includes at least one user device 520 and at least one server device 570. The at least one user device 520 is configured to interface with a user 502, and the at least one server device 570 is configured to communicate with the user device 520 via the network 550.

The network 550, in one embodiment, may be implemented as a single network or a combination of multiple networks. For example, in one embodiment, the network 550 may comprise a wireless telecommunications network (e.g., cellular phone network) adapted to communicate with other communication networks, such as the Internet. In various other embodiments, the network 550 may include the Internet and/or one or more intranets, landline networks, wireless networks, and/or other appropriate types of communication networks adapted to communicate with a wireless telecommunications network.

The user device 520, in various embodiments, comprises a mobile communication and computing device, such as a cell phone, a personal digital assistant (PDA), a laptop, or various other generally known types of mobile communication and computing devices adapted to communicate with the server device 570 via the network 550. The user device 520 may be implemented using any appropriate combination of hardware and/or software configured for wired and/or wireless communication over the network 550. In one aspect, it should be appreciated that the user device 520 may be referred to as a client device without departing from the scope of the present disclosure.

The user device 520, in one embodiment, includes a service application 522 that may be utilized by the user 502 to access and/or browse data and information made available to the user 502 by the server device 570 over the network 550. For example, the service application 522 may be implemented as a network gateway to retrieve, store, and display task instruction data and information (e.g., instruction data, information and/or files related to service tasks) provided by the server device 570 over the network 550.

In one implementation, the service application 522 provides access to relevant task instruction data and information to the user 502 for use in field service activities. The service application 522 may access and retrieve one or more task instruction records and store the one or more records in a local memory component, such as database 526.

In one implementation, the service application 522 provides access to service data and information for operating, maintaining, and repairing machinery, such as an airplane, and the service application 522 is adapted to store the accessed data and information in database 526 for ease of access by the user 502 via user device 520, which may comprise an ultra-portable device, such as mobile cellular phone. As described in greater detail herein, data and information may be retrieved from the server device 570, stored locally on the user device 520, and displayed for viewing by the user 502.

In one implementation, the service application 522 comprises a software application that is uploadable from the server device 570 to the user device 520. The user device 520 is adapted to display data and information tailored to particular machinery (e.g., aircraft) as designated by the user 502 via user input, which may be stored in database 526 of the user device 520. The user inputted data and information may be transmitted to the server device 570 via the network 550 for storage and processing by the server device 570. This data and information may be associated with an appropriate task related to the particular machinery.

The user device 520, in one embodiment, may include a network interface application 524, which may be utilized by the user 502 to communicate with the server device 570 via the network 550. For example, the network interface application 524 may utilize a graphical user interface (GUI) in connection with the service application 522 for viewing of task instruction data and information including related repair data and information.

The user device 520, in one embodiment, may include one or more user identifiers associated with hardware of the user device 520, or various other appropriate identifiers. The user identifier may include attributes related to the user 502, such as security information (e.g., user name, password, photograph image, biometric id, address, phone number, etc.). In various implementations, the user identifier may be passed with a user service request to the server device 570, and the user identifier may be used by the server device 570 to provide the user 502 with access to data and information stored by the server device 570.

The user device 520, in various embodiments, may include other applications as may be desired in particular embodiments to provide additional features available to the user 502. For example, such other applications may include security applications for implementing client-side security features, programmatic client applications for interfacing with appropriate application programming interfaces (APIs) over the network 550 or various other types of generally known programs and/or applications.

The user device 520, in one embodiment, may include one or more databases 526 adapted to store and archive various types of data and information including data and information related to service procedures and task instructions. In various embodiments, the one or more databases 526 may comprise a removable memory component, such as a smart card, and/or an internal memory component, such as a ROM component. In one aspect, data and information related to task instructions for machinery, such as an airplane, may be downloaded from the server device 570 and stored on the user device 520 in the one or more databases 526. In various aspects, the downloaded task instructions may be stored in various ways using unique indexes to optimize retrieval. As such, an indexer may use noun phrase collocation and simplified-English specific phrases and/or grammar for indexing and organization.

The server device 570, in one embodiment, comprises a network server adapted to communicate with the user device 520 via the network 550 and to operate as a data and information storage facility for transmitting and receiving data and information. The server device 570 may be implemented using any appropriate combination of hardware and/or software configured for wired and/or wireless communication over the network 550. The server device 570 is configured to retrieve and format relevant data and information (e.g., task instruction data and information) for transmission to the service application 522 of the user device 520.

The server device 570, in one embodiment, may include a processing application 572, a network interface application 574, and one or more databases 576. The network interface application 574, in one embodiment, may comprise a network communication device, module and/or application that allows the server device 570 to communicate with the user device 520 via the network 550 to facilitate transfer of data and information.

The processing application 572, in one embodiment, comprises a processing mechanism that allows retrieval and formatting of relevant data and information (e.g., task instruction data and information) for transmission to the user device 520 via the network 550. For example, the user 502 may input into the user device 520 a serial number for a machine (e.g., an aircraft) and/or part thereof and then request and receive repair task instructions related to the machine and/or part thereof from the database 576 of the server device 570. This allows the user 502 to quickly retrieve repair task instructions related to the machine and/or part thereof. In one aspect, the task instructions may reference other related task instructions that may be associated with other parts of the machine. For example, an engine part of an airplane may have a plurality of other related engine parts associated with that particular engine part. As such, task instructions related to these other related engine parts may also be retrieved from the server device 570.

The database 576, in one embodiment, comprises one or more databases adapted to store and archive data and information including task instructions data and information, which may be uploaded for storage in database 526 of the user device 520. In various implementations, the uploaded task instructions may be stored in various ways using unique indexes to optimize retrieval. As such, an indexer may use noun phrase collocation and simplified-English specific phrases and/or grammar for indexing and organization.

The server device 570, in one embodiment, may include one or more server identifiers, which may be implemented, for example, as operating system registry entries, identifiers associated with hardware of the server device 570, or various other appropriate identifiers that identify the server device 570. The server identifier may include attributes related to a company or organization that provides and/or operates the server device 570 and/or an administrator or operator of the server device 570. The attributes may be implemented as security information (e.g., a company name, address or phone number, or operator name, password, photograph image or biometric id.). In various aspects, the server identifier may be passed with a response to a user request for data and information.

It should be appreciated that, in one embodiment, the user device 520 may be adapted to include one or more applications and/or operations of the server device 570 without departing from the scope of the present disclosure. As such, in one implementation, the service application 522 of the user device 522 may include one or more applications and/or operations related to the processing component 572 of the server device 570.

In accordance with one or more embodiments of the present disclosure, the service application 522 is downloadable to the user device 520, which may comprise an ultra-portable device (e.g., a cell phone or PDA) that is adapted to guide the user 502 through a task using interactive instructions. As described in greater detail herein, various processes may be performed with point-of-use guidance using the user device 520 to deliver sequential instructions with accompanying videos, graphics, and/or illustrations that are viewable by the user 502 from a display component of the user device 520.

In one implementation, the service application 522 guides the user 502 through a task with a step-by-step instruction sequence. For example, instructions may be provided directly to the user 502 via the user device 520. In some situations, the user 502 may not be skilled in the task at a particular location (e.g., remote location) where the work needs to be performed, and thus, the step-by-step instruction sequence provides guidance to the user 502.

In another implementation, the service application 522 serves as a point-of-use device (e.g., coaching device) to demonstrate proper service techniques. The service application 522 enables service to be performed in an uninterrupted manner on site (i.e., point-of-use) without excursions to retrieve information stored in other locations, such as in a service manual. The service application 522 also enables non-specialized personnel to be coached or trained on the spot to perform tasks above their skill level.

Figure 6:
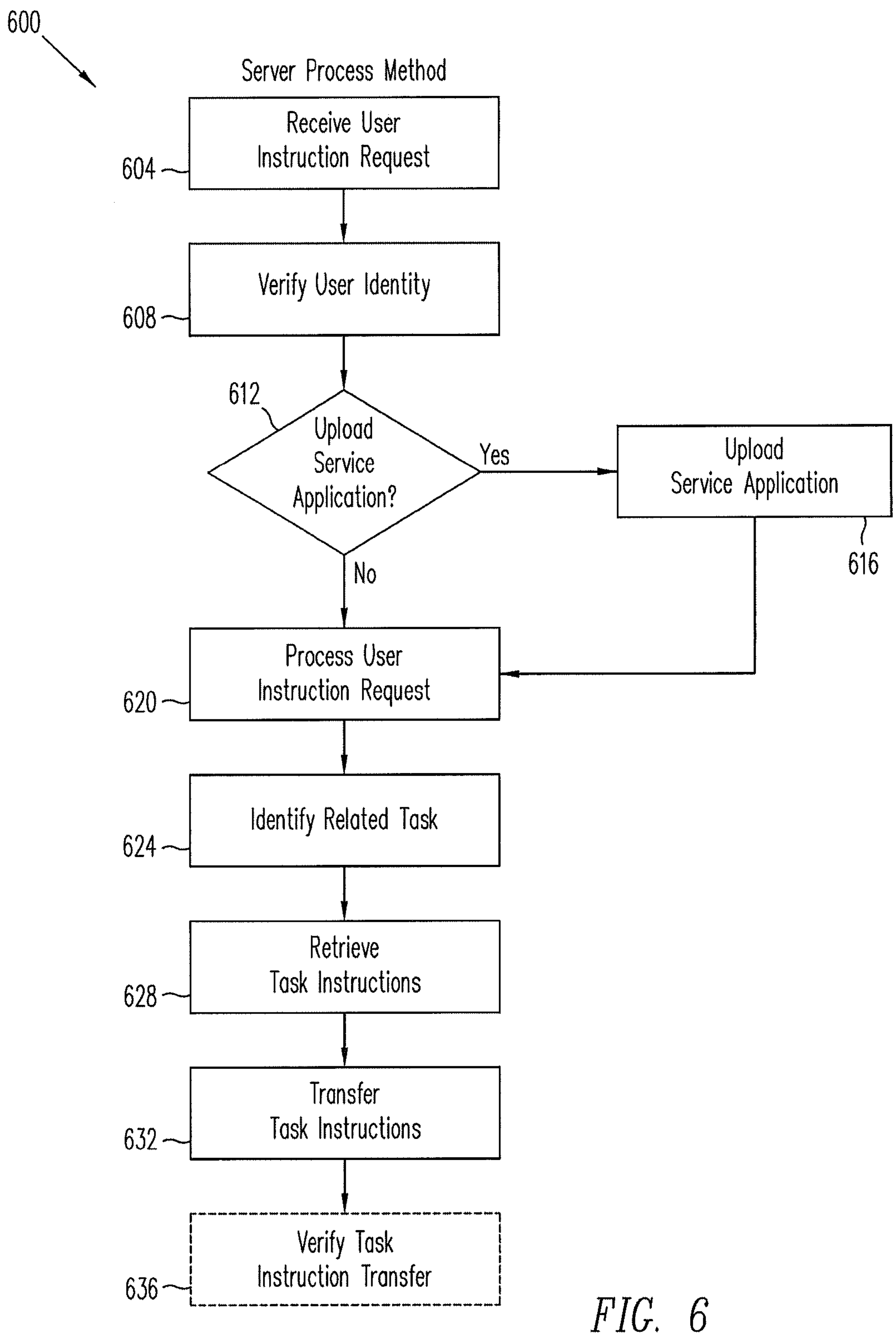
FIG. 6 shows a block diagram of a server process method for transferring data and information over a network, in accordance with one or more embodiments of the present disclosure.

FIG. 6 shows one embodiment of a server process method 600 for transferring task instruction data and information to the user device 520 via the network 550. In one implementation, the server device 570 receives a user instruction request from the user 502 via the user device 520 over the network 550 (block 604).

Next, the server device 570 verifies the identity of the user 502 based on information passed with the user instruction request (block 608). For example, the user 502 may login to the server device 570 by providing a user name and password.

Next, the server device 570 determines whether to upload the service application 522 to the user device 520 via the network 550 based on information passed with the user instruction request (block 612). For example, the user 502 may request permission to download the service application 522 as part of the user instruction request. As such, the server device 570 may decide to upload the service application 522 to the user device 520 (block 616) and then process the user instruction request (block 620). Otherwise, if the server device 570 determines that an upload is not necessary, then the server device proceeds with processing the user instruction request (block 620).

Next, the server device 570 identifies one or more tasks related to the user instruction request based on information passed with the request (block 624) and retrieves one or more task instructions from the database 576 based on information passed with the user instruction request (block 628). For example, the server device 570 may receive information related to a serial number for an aircraft and/or part thereof and then retrieve repair task instructions related to the aircraft and/or part thereof from the database 576. In one aspect, the task instructions may reference one or more other related task instructions that may be associated with one or more other parts of the aircraft and/or parts thereof.

Next, the server device 570 transfers the retrieved task instructions to the user device 520 via the network 550 (block 632). Next, the server device 570 may optionally verify the transfer of the task instructions to the user device 520 via the network 550 (block 636). In one implementation, verification of transfer may include receiving a response from the user device 520 upon delivery.

Figure 7:
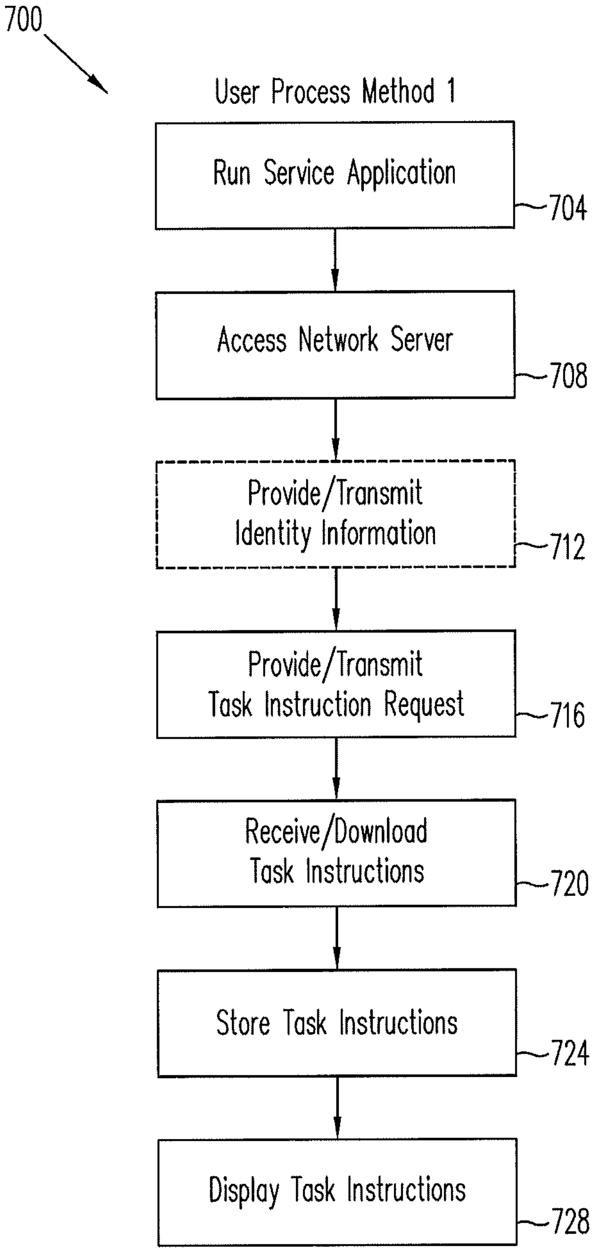
FIGS. 7-8 show block diagrams of various user process methods for requesting and receiving data and information over a network, in accordance with one or more embodiments of the present disclosure.

FIG. 7 shows one embodiment of a user process method 700 for requesting and receiving task instruction data and information via the user device 520 over the network 550. In one implementation, the user 502 runs (i.e., executes and/or operates) the service application 522 on the user device 520 (block 704). In various examples, the service application 522 may be downloaded from the server device 570 via the network 550 prior to use by the user 502, or if previously downloaded and/or installed on the user device 520, then the user 502 opens the service application 522 for use thereof on the user device 520.

Next, the user 502 accesses the server device 570 via communication between the user device 520 and the server device 570 over the network 550 (block 708). In one example, if the user device 520 comprises a cell phone, the user 502 may access the server device 570 via a cell phone communication network, as the network 550.

Next, the user 502 may be optionally prompted to provide and/or transmit user identity information to the server device 570 to verify the identity of the user 502 (block 712). In one example, the user 502 may be prompted to provide identity information related to the user 502, such as, for example, a login name and password, for access to data and information (e.g., task instruction data and information) stored in the database 576 of the server device 570.

Next, the user 502 provides and/or transmits a task instruction request to the server device 570 (block 716). In one example, the user 502 provides a task instruction request to the server device 570 via the network 550 to access task instruction data and information stored in the database 576 of the server device 570.

Next, the user 502 receives and/or downloads task instructions from the server device 570 via the network 550 (block 720). Next, the received task instructions may be stored on the user device 520 (block 724). In one example, the received task instructions are stored locally in the database 526 of the user device 520 for review and/or analysis by the user 502. As such, the stored task instructions may be displayed on the user device 520 (block 728). In one example, the stored task instructions are accessible and retrievable from the database 526 for display on a display component of the user device 520 for visual review and/or analysis by the user 502.

Figure 8:
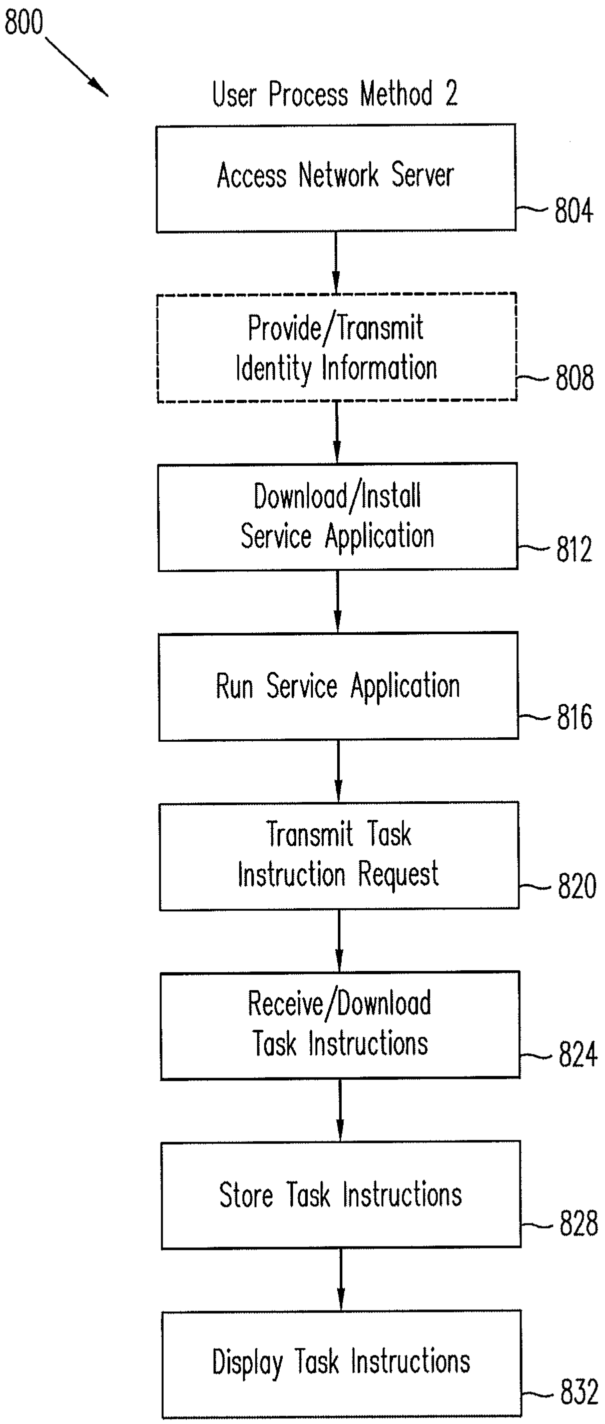

FIG. 8 shows one embodiment of another user process method 800 for requesting and receiving task instruction data and information via the user device 520 over the network 550. In one implementation, the user 502 accesses the server device 570 via communication between the user device 520 and the server device 570 over the network 550 (block 804). In one example, if the user device 520 comprises a cell phone, the user 502 may access the server device 570 via a cell phone communication network, as the network 550.

Next, the user 502 may be optionally prompted to provide and/or transmit user identity information to the server device 570 to verify the identity of the user 502 (block 808). In one example, the user 502 may be prompted to provide identity information related to the user 502, such as, for example, a login name and password, for access to data and information (e.g., task instruction data and information) stored in the database 576 of the server device 570.

Next, the user 502 downloads the service application 522 from the server device 570 via the network 550 for storage and installation on the user device 502 (block 812). Once installed, the user 502 runs (i.e., executes and/or operates) the service application 522 on the user device 520 (block 816). In various examples, the service application 522 may be downloaded from the server device 570 via the network 550 prior to use by the user 502, and once installed, then the user 502 opens the service application 522 for use thereof on the user device 520.

Next, the user 502 provides and/or transmits a task instruction request to the server device 570 (block 820). In one example, the user 502 provides a task instruction request to the server device 570 via the network 550 to access task instruction data and information stored in the database 576 of the server device 570.

Next, the user 502 receives and/or downloads task instructions from the server device 570 via the network 550 (block 824). Next, the received task instructions may be stored on the user device 520 (block 828). In one example, the received task instructions are stored locally in the database 526 of the user device 520 for review and/or analysis by the user 502. As such, the stored task instructions may be displayed on the user device 520 (block 832). In one example, the stored task instructions are accessible and retrievable from the database 526 for display on a display component of the user device 520 for visual review and/or analysis by the user 502.

Figure 9:
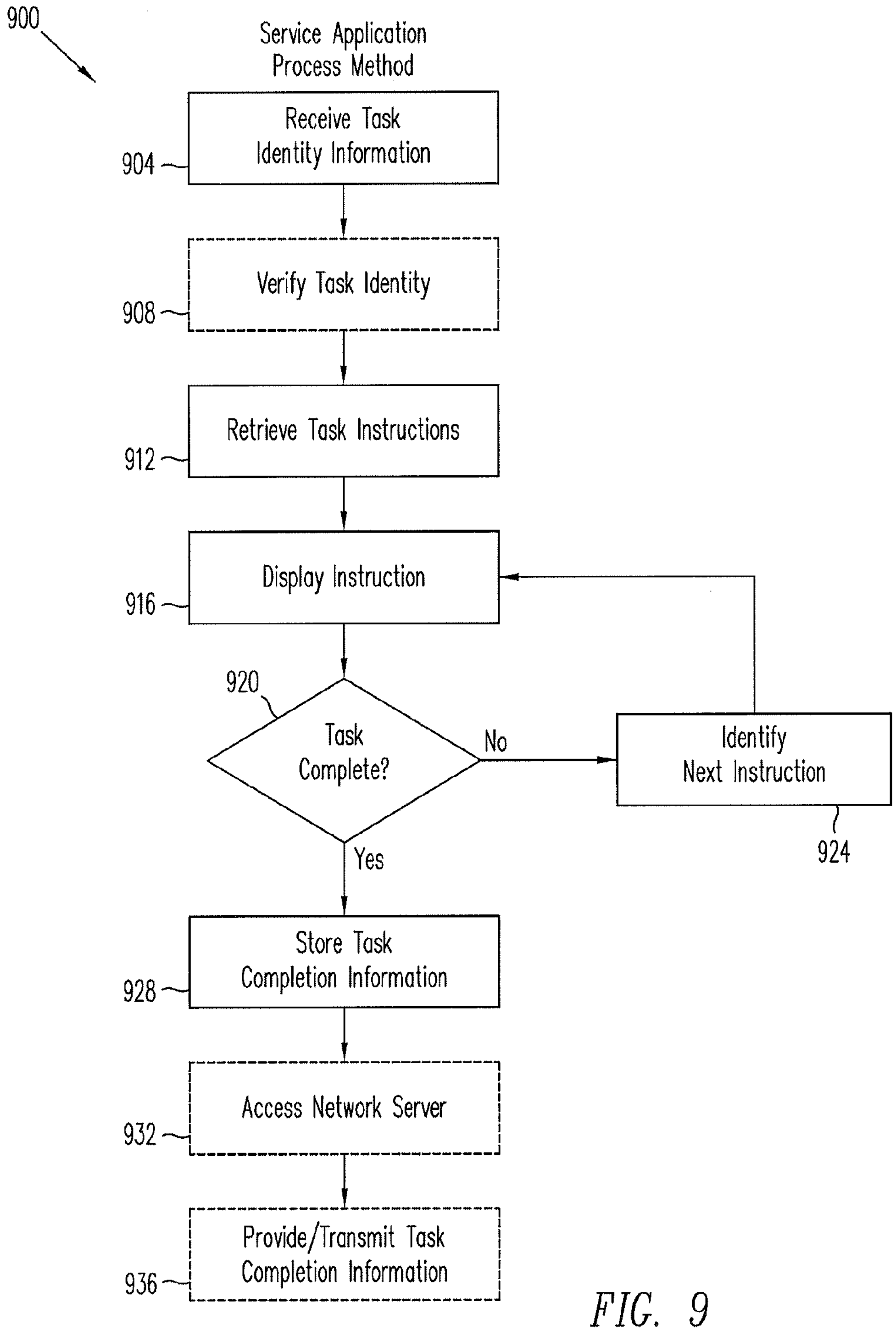
FIG. 9 shows a block diagram of a service application process method for providing data and information to a user over a network, in accordance with one or more embodiments of the present disclosure.

FIG. 9 shows one embodiment of a service application process method 900 for providing task instruction data and information to a user, such as user 502, via the user device 520. In one aspect, the task instruction data and information may be displayed to the user 502 via a display component (e.g., a display screen or window) of the user device 520 (e.g., a cell phone device) for visual review by the user 502. In another aspect, the task instruction data and information comprises a step-through-sequence of instructions that allow the user 502 to perform and complete an instruction before accessing the next instruction in the sequence.

In one implementation, the service application 522 receives task identity information from the user 502 via the user device 520 (block 904). In one aspect, the service application 522, when executed, may prompt the user 502 for a task serial number that specifies a particular task instruction sequence for display on the user device 502. For example, as described in reference to FIGS. 1-4, 10 and 11A-11J, the task serial number may refer to a task instruction sequence for a ramp recorder process when assessing aircraft damage and malfunction incidents. In another example, the task identity information may include data and information related to a location of damage to a machine (e.g., an aircraft, such as a commercial airplane), which may be useful in retrieving appropriate task instructions.

Next, the service application 522 may optionally verify the task identity and/or the task identity information with the user 502 to ensure that the appropriate task instruction sequence is retrieved and provided to the user 502 via the user device 520 (block 908). In one example, verifying task identity may refer to the user 502 verifying that the correct task identity serial number was provided to the service application 522.

Next, the service application 522 retrieves the task instructions related to the received and/or verified task identity information (block 912). In one example, the service application retrieves the task instructions from the database 526 of the user device 520 as stored.

Next, the service application 522 displays the retrieved task instructions (block 916). In one example, the retrieved task instructions are displayed on a display component of the user device 520 for visual review and/or analysis by the user 502.

Next, the service application 522 determines is the task instruction sequence is complete (block 920). If no, then the service application 522 identifies (block 924) and displays (block 916) the next instruction in the task instruction sequence to the user 502. If yes, then the service application 522 stores task completion information related to the task instructions in the database 526 of the user device 520 (block 928). In one aspect, the user 502 steps through the sequence of task instructions to perform and complete an instruction before accessing the next instruction in the sequence. As such, the service application 522 provides the user 502 with access to each individual instruction and control over when and if the particular instruction is completed.

Next, the service application 522 may optionally access the server device 570 via the network 550 (block 932) and optionally provide and/or transmit the task completion information (block 936) to the server device 570 via the network 550 for storage in the database 576 of the server device 570. In various examples, the service application 522 may automatically provide the task completion information to the server device 570 upon completion of a task as indicated by the user 502, or the service application 522 may at least prompt the user 502 for permission to provide the task completion information to the server device 570.

Figure 10A:
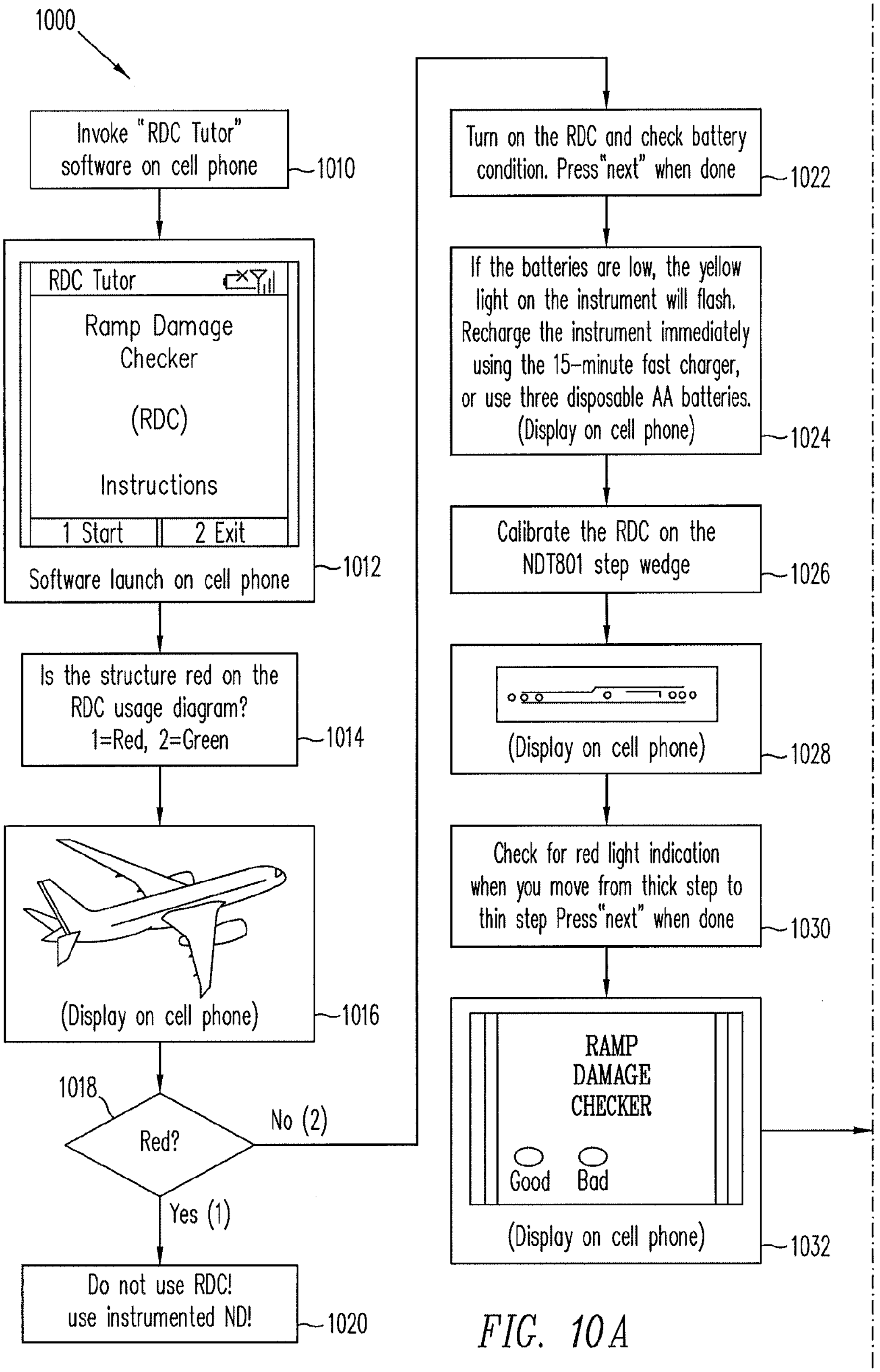
FIG. 10 shows a block diagram of a task instruction sequence, in accordance with one or more embodiments of the present disclosure.
Figures 10, 10B:
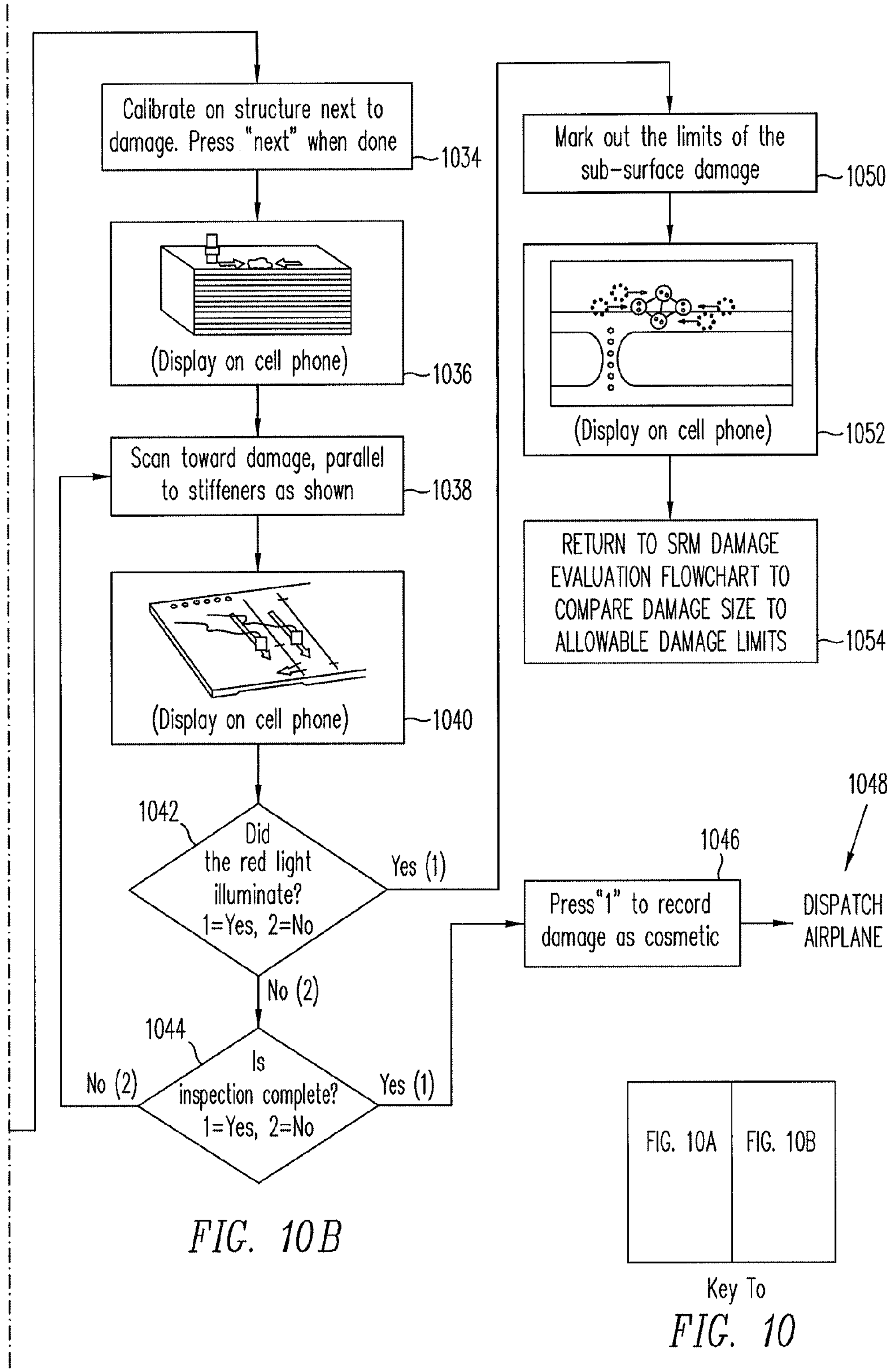

FIG. 10 shows one exemplary embodiment of a task instruction sequence 1000 that may be displayed to a user, such as user 502, on the user device 520. In one implementation, the task instruction sequence 1000 of FIG. 10 refers to task instructions related to a ramp damage checker (RDC) process, as described herein with reference to FIGS. 1-4. Referring to FIG. 10, FIGS. 11A-11J show exemplary embodiments of various task instructions that may be displayed in sequence to a user, such as user 502, on the user device 520.

Figure 11B:
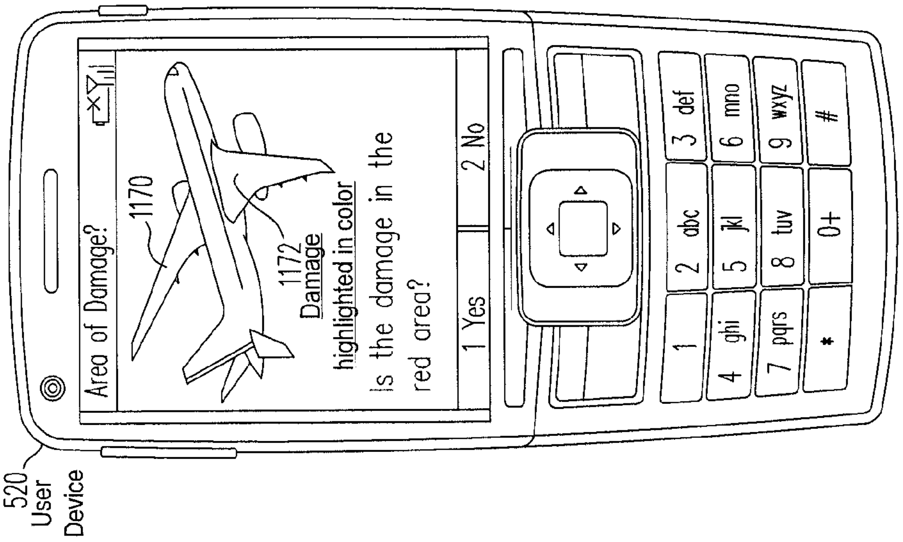
FIGS. 11A-11J show exemplary embodiments of various task instructions that may be displayed to a user, in accordance with the present disclosure.

In one embodiment, during a user walk-around or inspection routine, a scuff and/or dent may be noticed on an external surface (e.g., a composite skin) of a machine (e.g., an aircraft, such as a commercial airplane). The user 502 (e.g., a mechanic, technician or ramp supervisor) obtains a Ramp Damage Checker (RDC) device (i.e., RDC instrument) 1180 of FIG. 11K from a maintenance equipment area. Next, the user 502 selects and executes the service application 522 (e.g., RDC related service application) for execution on the user device 520 (e.g., a cell phone) (block 1010), which may have been previously downloaded to the user device 520 from the server device 570 via the network 550.

Figure 11A:
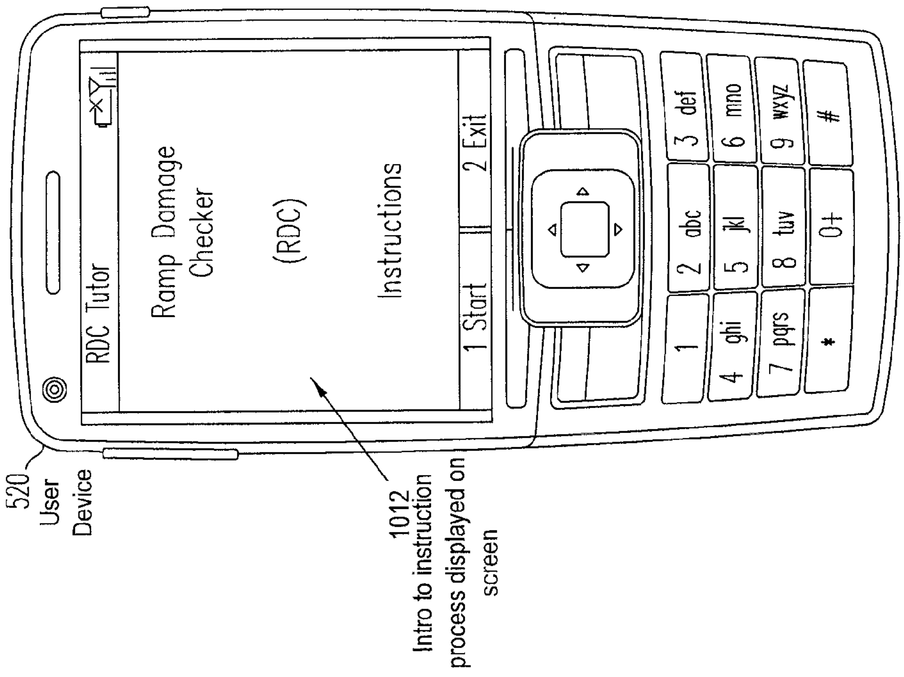

Next, upon execution, the RDC service application 522 displays a graphical introduction to the RDC instruction process (block 1012). FIG. 11A shows one embodiment of executing the RDC service application 522 on the user device 520, which may comprise a cell phone.

Next, the RDC service application 522 prompts the user 502 to select and indicate the area of damage on the aircraft (block 1014) from a displayed image on the user device 520 (block 1016). For example, referring to FIG. 11B, a first area may of damage be highlighted in a first color 1170 (e.g., red color), and a second area of damage may be highlighted in a second color 1172 (e.g., green color). The user 502 makes a decision (block 1018) by selecting a color from the displayed image, as shown in FIG. 11B, with the pressing of a key on a keypad of the user device 520. If the selected color is red by pressing the number 1 key on the user device 520, then the RDC device 1180 should not be used (block 1020), and a related message is displayed to the user 502 on the user device 520. Otherwise, if the selected color is green by pressing the number 2 key on the user device 520, then the user 502 advances to the next instruction on the user device 520.

Figure 11C:
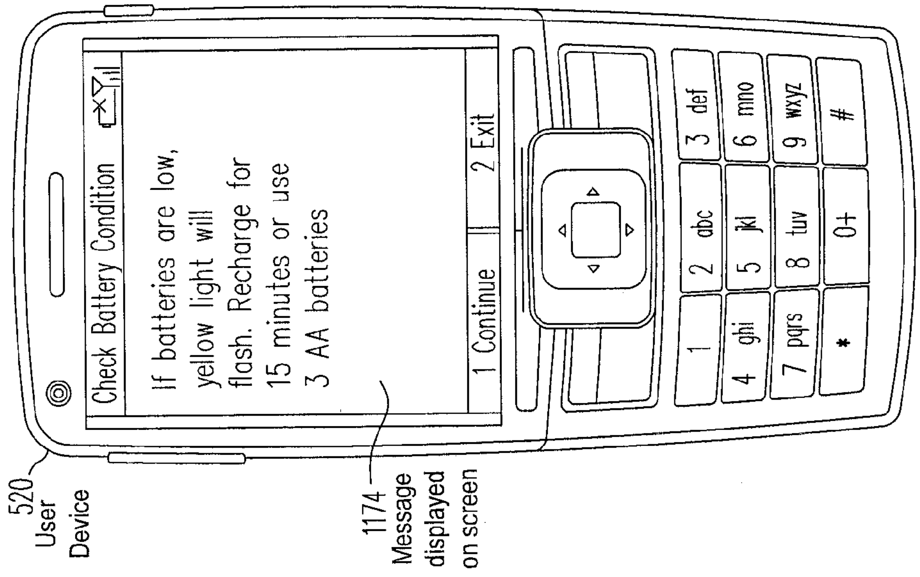

Next, the RDC service application 522 prompts the user 502 to power-up the RDC device 1180 (block 1022). In one aspect, a first indicator light 1184 of the RDC device 1180 may show a green light, which informs the user 502 that the RDC device 1180 is powered-up. When complete, the user 502 advances to the next instruction on the user device 520. If, after power-up, the batteries of the RDC device 1180 are low, then the user device 520 informs the user 502 to recharge the batteries or replace the batteries (block 1024). For example, as shown in FIG. 11C, if the batteries are low, the user device 520 provides a message 1174 to the user 502.

Figure 11D:
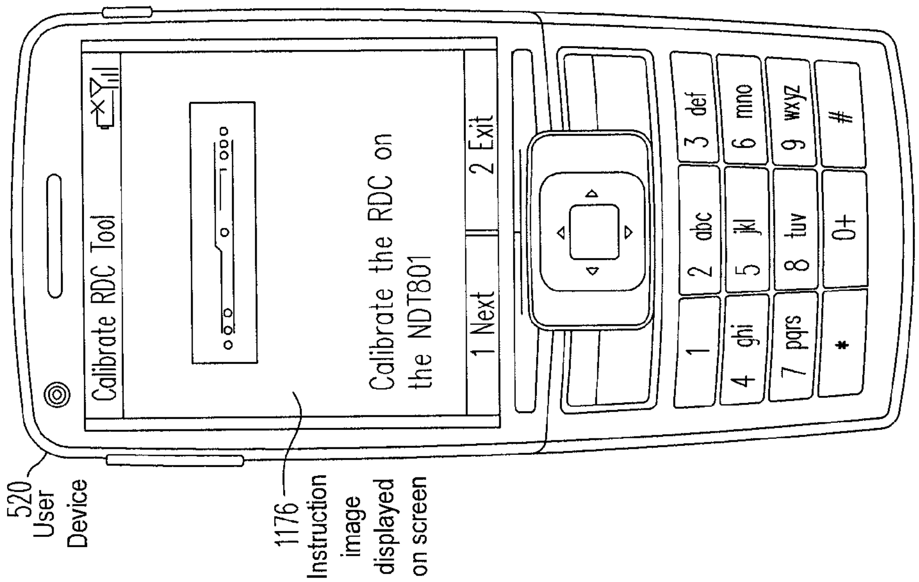
Figure 11F:
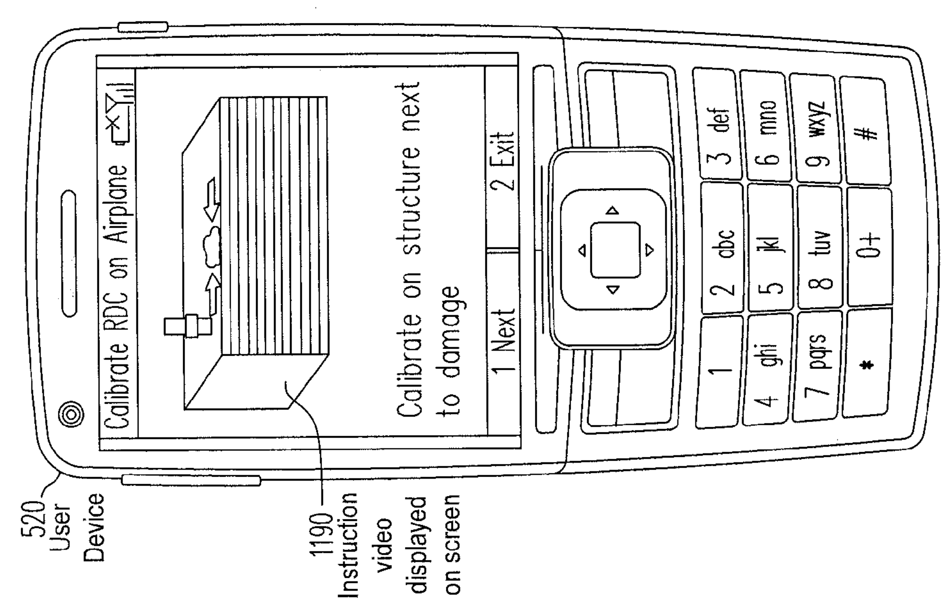
Figure 11E:
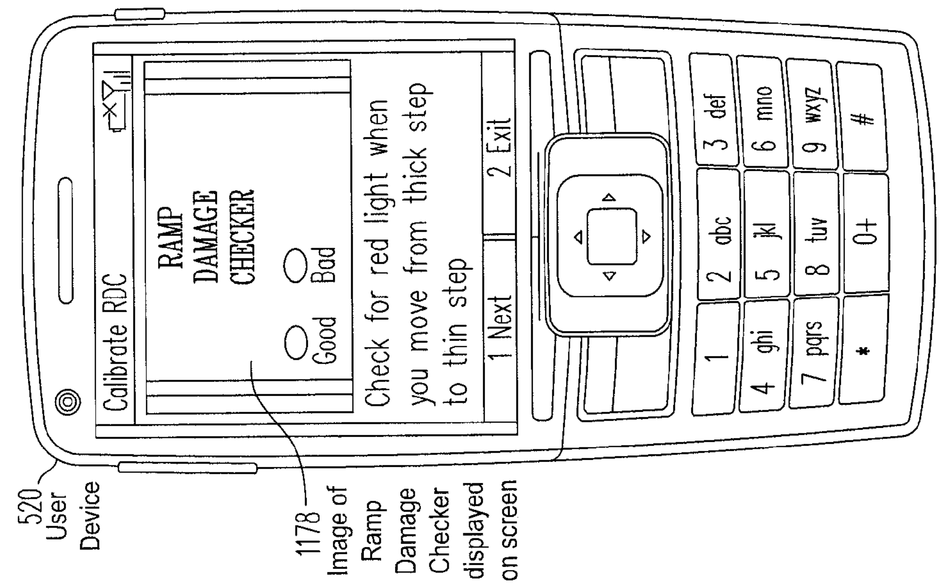

Next, the RDC service application 522 may instruct the user 502 to calibrate the RDC device 1180 (block 1026) by displaying an image 1176, as shown in FIG. 11D, on the user device 520 (block 1028), and then test the response. In one aspect, the first indicator light 1184 of the RDC device 1180 may show a green light (block 1030), which informs the user 502 that the RDC device 1180 is calibrated. In one aspect, the RDC service application 522 displays an image 1178, as shown in FIG. 11E, on the user device 520 (block 1030). When complete, the user 502 advances to the next instruction on the user device 520.

Next, the RDC service application 522 instructs the user to calibrate the RDC device 1180 in good laminate material next to the visible damage location on the aircraft (block 1034) and may show an instructional video 1190 on the user device 520 (block 1036) to assist the user 502 with scanning the aircraft. In one aspect, the first indicator light 1184 of the RDC device 1180 may show a green light, which informs the user 502 that the RDC device 1180 is calibrated with reference to the good laminate material on the aircraft. When complete, the user 502 advances to the next instruction.

Figure 11H:
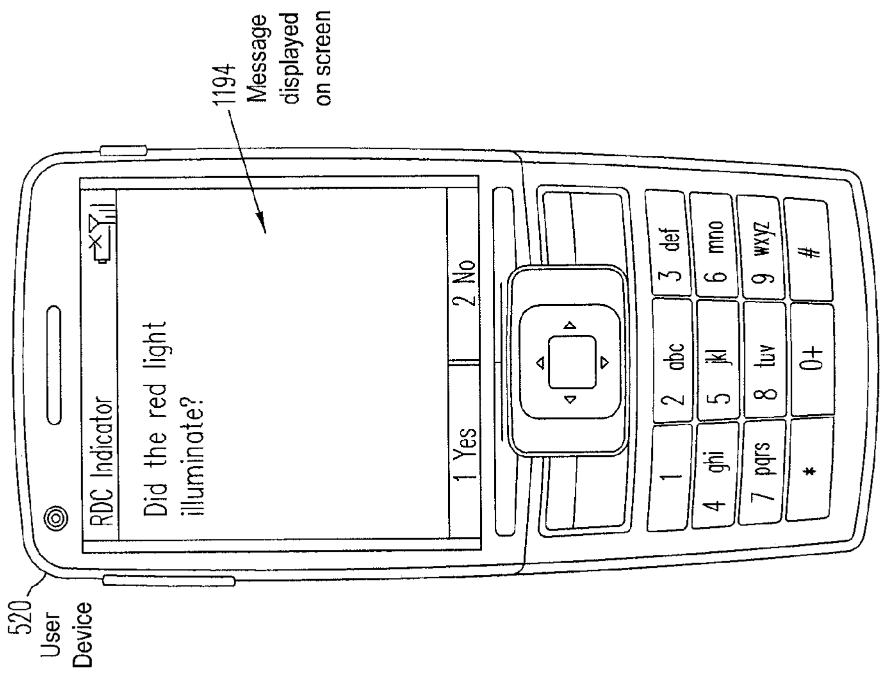
Figure 11G:
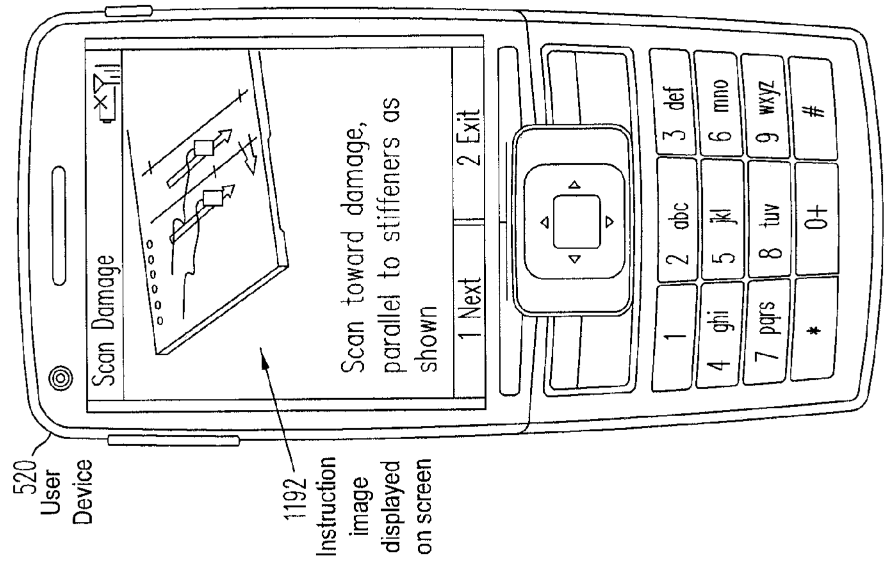
Figure 11J:
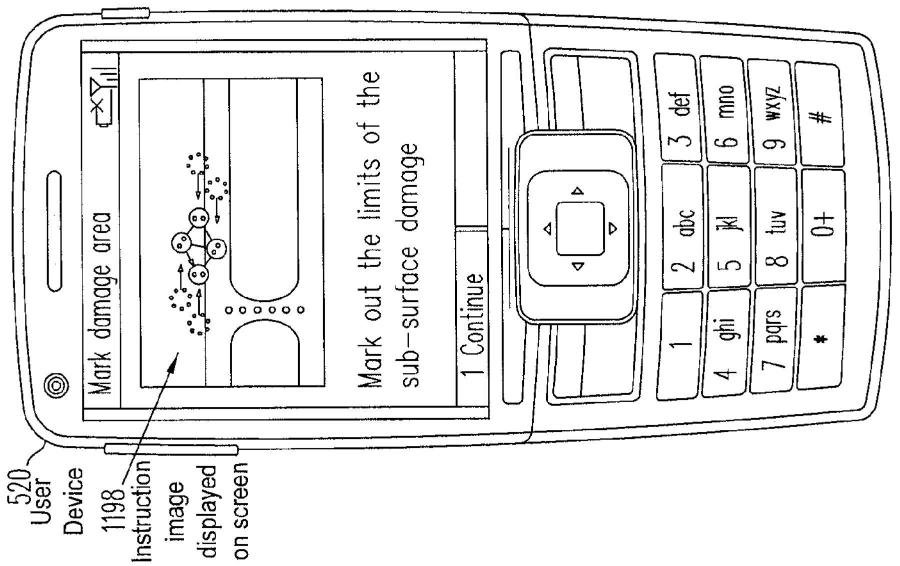

Next, the RDC service application 522 instructs the user 502 to use the RDC device 1180 to scan toward the damage on the aircraft (block 1038), while careful to scan only in an approved (forward-aft) direction as displayed in an image 1192, as shown in FIG. 11G, by the user device 520 (block 1040). In addition, the RDC service application 522 instructs the user 502 to calibrate the RDC device 1180 on the opposite side of the visible damage location. In one aspect, the RDC service application 522 instructs the user 502 to scan toward the damage in an opposite direction to that previously used, while careful to scan only in the approved (forward-aft) direction. If the indicator light turns red (block 1042), a message 1194 is displayed to the user 502 on the user device 520, as shown in FIG. 11H, and then the user 502 may press a red button on the RDC device 1180. Next, the user 502 is guided to the flaw marking procedure (blocks 1050 and 1052), as further shown by image 1198 in FIG. 11J, and instructions for comparing the flaw to allowable damage parameters or limits (block 1054).

Figure 11I:
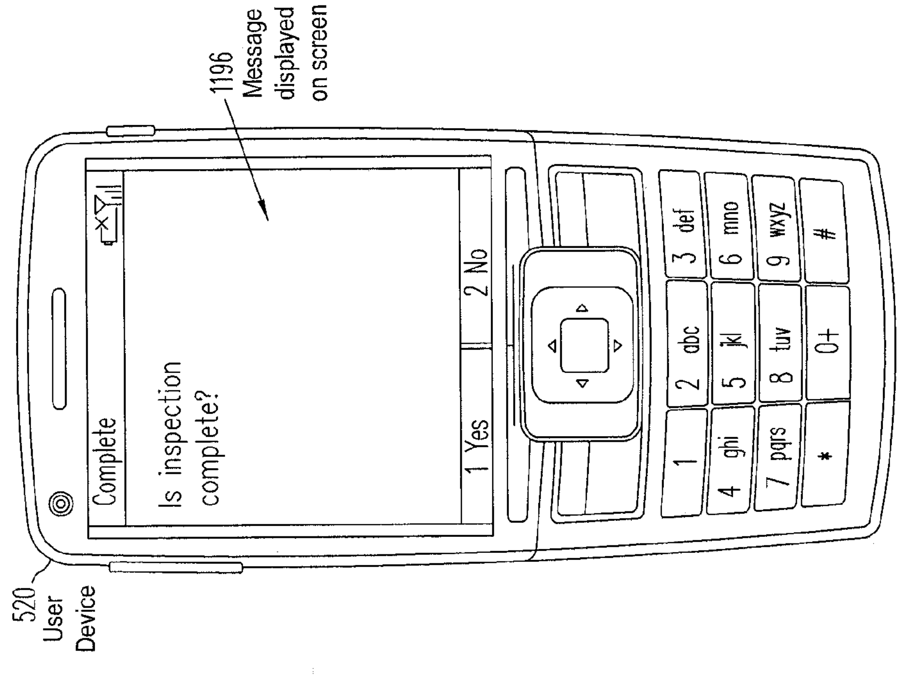
Figure 11K:
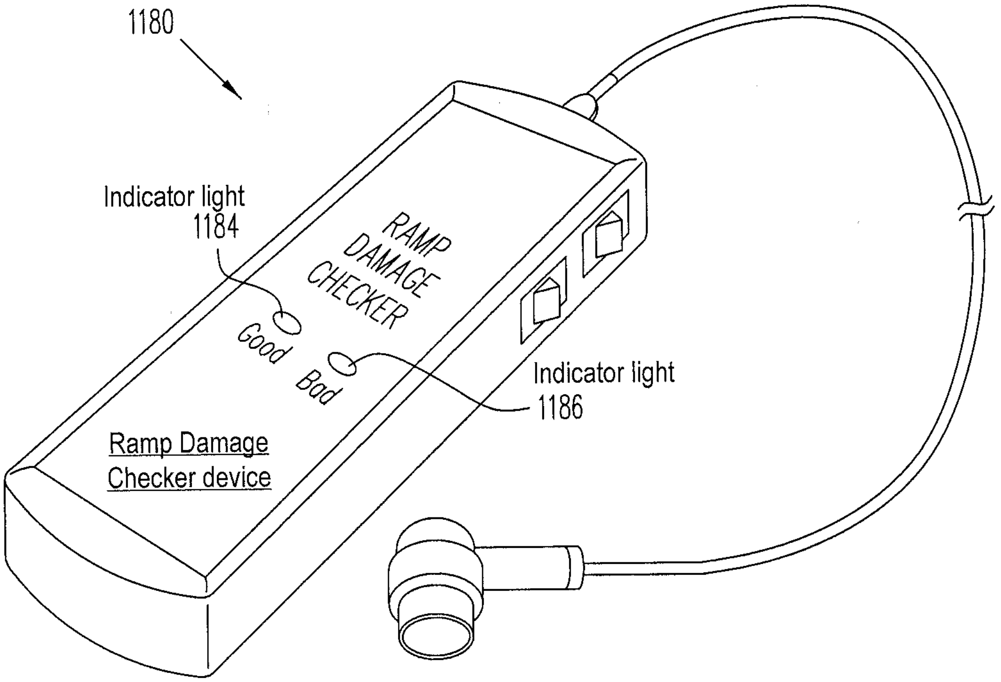
FIG. 11K shows an exemplary Ramp Damage Checker device, in accordance with the present disclosure.

Otherwise, if the first indicator light 1184 on the RDC device 1180 remains green, then the user 502 presses a green variable function button on RDC device 1180 and proceeds to make a decision as to whether the inspection is complete (block 1044). In one aspect, a message 1196 is displayed to the user 502 on the user device 520, as shown in FIG. 11I, and then the user 502 may press a button on the user device 520 to record the damage as cosmetic (block 1046), and then the user 502 is instructed that the aircraft may be released for service (block 1048). If the inspection is not complete (block 1044), then the user 502 is directed to rescan (block 1038). It should be appreciated by those skilled in the art that various other procedures to repair a machine, such as an aircraft, may be implemented in a similar manner as described above, without departing from the scope of the present disclosure.

Figure 12:
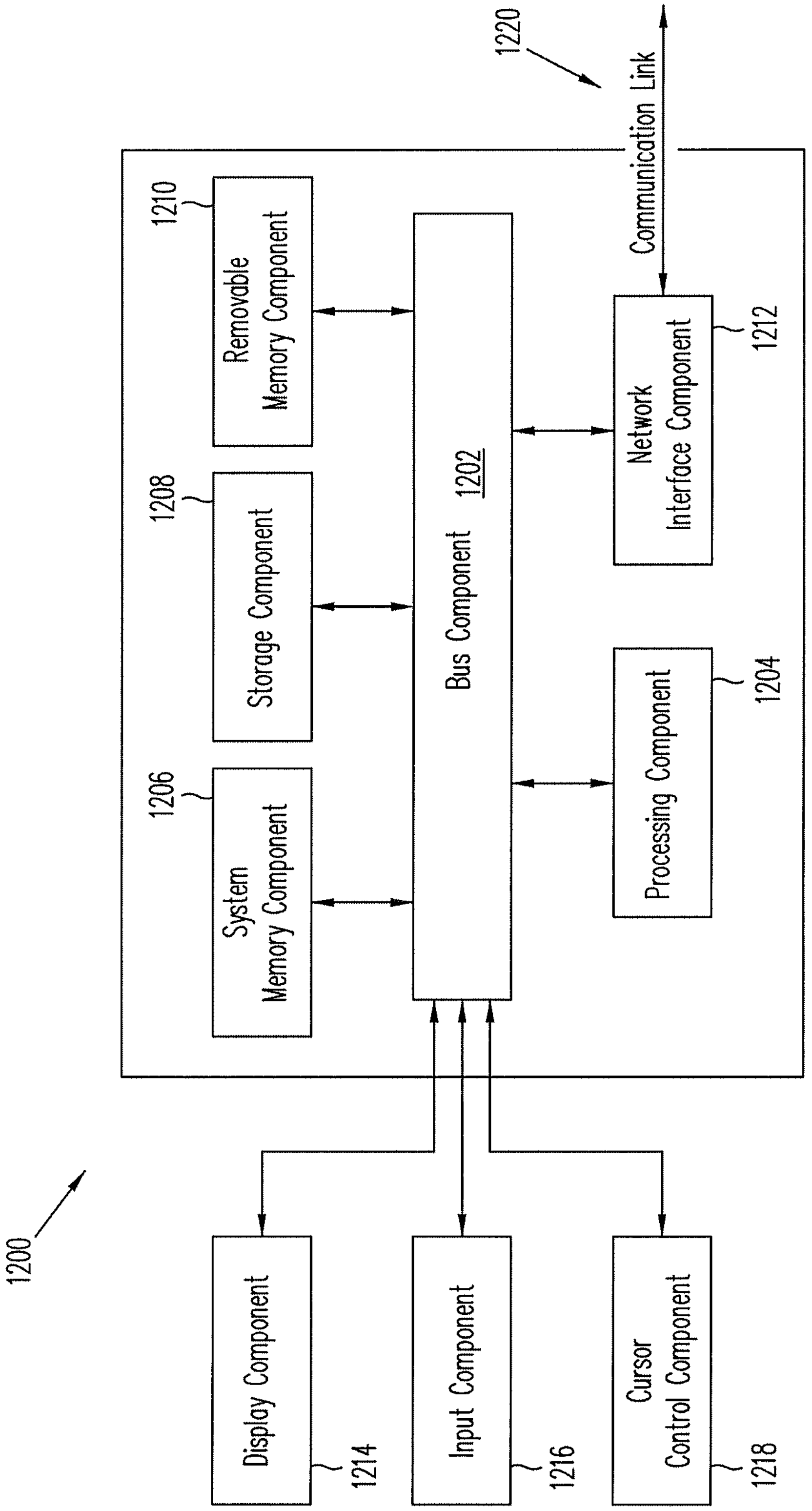
FIG. 12 is a block diagram of a computer system suitable for implementing one or more embodiments of the present disclosure.

FIG. 12 is a block diagram of a computer system 1200 suitable for implementing one or more embodiments of the present disclosure, including the user device 520 and the server device 570 of FIG. 5. In various implementations, the user device 520 may comprise a personal computing device, such as a personal computer, laptop, PDA, etc., and the server device 570 may comprise a network computing device, such as a server. It should be appreciated that the devices 520, 570 may be implemented as the computer system 1200 in a manner as follows.

In accordance with various embodiments of the present disclosure, the computer system 1200, such as a personal computer and/or a network server, includes a bus 1202 and/or other communication mechanism for communicating information, which interconnects subsystems and components, such as processing component 1204 (e.g., processor, micro-controller, digital signal processor (DSP), etc.), system memory component 1206 (e.g., RAM), static storage component 1208 (e.g., ROM), disk drive component 1210 (e.g., magnetic or optical), network interface component 1212 (e.g., modem or Ethernet card), display component 1214 (e.g., CRT or LCD), input component 1216 (e.g., keyboard), and cursor control component 1218 (e.g., mouse or trackball). In one implementation, disk drive component 1210 may comprise a database having one or more disk drive components.

In accordance with one or more embodiments of the present disclosure, computer system 1200 is adapted to perform specific operations by processor 1204 executing sequences of one or more instructions contained in system memory component 1206. Such instructions may be read into system memory component 1206 from another computer readable medium, such as static storage component 1208 or disk drive component 1210. In various other embodiments, hard-wired circuitry may be used in place of or in combination with software instructions to implement the present disclosure.

In various implementations, logic may be encoded in a computer readable medium, which may refer to any medium that participates in providing instructions to processor 1204 for execution. Such a medium may comprise many forms, including but not limited to, non-volatile media, volatile media, and transmission media. In various implementations, non-volatile media includes optical or magnetic disks, such as disk drive component 1210, volatile media includes dynamic memory, such as system memory component 1206, and transmission media includes coaxial cables, copper wire, and fiber optics, including wires that comprise bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various implementations, execution of instruction sequences to practice the present disclosure may be performed by computer system 1200. In various other embodiments of the present disclosure, a plurality of computer systems 1200 coupled by communication link 1220 (e.g., network 550 of FIG. 5, LAN, WLAN, PTSN, or various other wired or wireless networks including cell phone networks) may perform instruction sequences to practice the present disclosure in coordination with one another.

In various implementations, computer system 1200 may transmit and receive messages, data, information, and/or instructions, including one or more programs (e.g., application code, such as service application 522) through the communication link 1220 and the communication interface 1212. In one aspect, received program code may be executed by the processor 1204 as received and/or stored in the disk drive component 1210 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The one or more embodiments described herein illustrate but do not limit the subject matter of the present disclosure. It should be appreciate and understood by those skilled in the art that numerous modifications and variations are possible in accordance with the principles described herein with reference to the present disclosure. Accordingly, the scope of the present disclosure is defined only by the following claims.

We claim:

1. A computer-implemented system for transferring data over a network, the system comprising:

a memory for storing a database of instructions for a ramp-side inspection of aircraft damage or malfunction by ramp-side personnel;

a communication component configured to communicate with the ramp-side personnel via a portable communication device over the network; and a processor configured to:

present, on the portable communication device, a series of directed questions relating to a type and a location of the aircraft damage or malfunction in response to the ramp-side personnel initiating a decision tree interview with a quick reporting tree system for automated processing of the directed questions, receive a sequence of numeric entries entered on the portable communication device by the ramp-side personnel, wherein each of the numeric entries is a response to a corresponding one of the directed questions, and wherein the series of directed questions are generated according to a decision tree based on the responses by the ramp-side personnel to obtain information at finer levels of granularity for evaluating the aircraft damage or malfunction and suggesting disposition actions, build, using the sequence of numeric entries, a report code that encodes the type and the location of the aircraft damage or malfunction, amend the report code by appending one or more single-digit numbers that encode an instruction or recommendation according to the type and the location of the aircraft damage or malfunction, and transfer, via the communication component, at least a portion of the instructions from the database component to the portable communication device to deliver a step-by-step interactive instruction sequence based on the amended report code for the type and the location of the aircraft damage or malfunction.

2. The system of claim 1, wherein the portable communication device comprises at least one of a cell phone and personal digital assistant (PDA).

3. The system of claim 1, wherein the network comprises a cellular phone network.

4. The system of claim 1, wherein the step-by-step interactive instruction sequence is displayed to the user on a display component of the portable communication device.

5. The system of claim 4, wherein the step-by-step interactive instruction sequence comprises videos, graphics, and/or illustrations that are viewable by the ramp-side personnel from the display component.

6. The system of claim 1, wherein the step-by-step interactive instruction sequence comprises guidance on calibrating a nondestructive inspection (NDI) device and on inspecting composite damage with the NDI device.

7. The system of claim 1, wherein the portable communication device comprises a portable database component for storage of the at least a portion of the instructions, and wherein the portable communication device further comprises a processor configured to determine the sequence in which the at least a portion of the instructions are presented on the portable communication device.

8. The system of claim 1, wherein the portable communication device comprises a user input component configured to receive the sequence of numeric entries from the ramp-side personnel.

9. The system of claim 1, wherein the system comprises a server.

10. The system of claim 1, wherein the processor of the system is configured to determine the sequence in which the at least a portion of the instructions are presented on the portable communication device.

11. A computer-implemented method for transferring data over a network, the method comprising:

communicating with ramp-side personnel via a portable communication device over the network;

presenting, on the portable communication device, a series of directed questions relating to a type and a location of aircraft damage or malfunction in response to the ramp-side personnel initiating a decision tree interview with a quick reporting tree system for automated processing of the directed questions;

receiving a sequence of numeric entries entered on the portable communication device by the ramp-side personnel, wherein each of the numeric entries is a response to a corresponding one of the directed questions, and wherein the series of directed questions are generated according to a decision tree based on the responses by the ramp-side personnel to obtain information at finer levels of granularity for evaluating the aircraft damage or malfunction and suggesting disposition actions;

building, using the sequence of numeric entries, a report code that encodes the type and the location of the aircraft damage or malfunction;

amending the report code by appending one or more single-digit numbers that encode an instruction or recommendation according to the type and the location of the aircraft damage or malfunction; and transferring, from a database, instructions for a ramp-side inspection or remediation of the aircraft damage or malfunction to the portable communication device based on the amended report code for the type and the location of the aircraft damage or malfunction to deliver a step-by-step interactive instruction sequence relating to the aircraft damage or malfunction.

12. The method of claim 11, wherein the presenting the series of directed questions comprise displaying the series of directed questions on a display component of the portable communication device.

13. The method of claim 11, wherein the aircraft damage or malfunction comprises damage to a composite structure, the method further comprising receiving and analyzing data related to inspection of the damage to the composite structure using a nondestructive inspection (NDI) device.

14. The method of claim 11, further comprising preparing a damage report for the user based on the report code and deciding whether the aircraft is ready for use or repair based on the damage report.

15. The method of claim 13, wherein deciding whether the aircraft is ready for use or repair based on the damage report includes one or more of:

deciding to make minor repairs to the composite damage and dispatch the aircraft machine;

deciding to remove the aircraft from service for major repair; and deciding to dispatch the aircraft without repair.

16. The method of claim 11, wherein the portable communication device comprises at least one of a cell phone and a personal digital assistant (PDA), and wherein the network comprises a cellular phone network.

17. The method of claim 11, wherein the transferring the instructions comprises transferring the instructions to a portable database component of the portable communication device for storage of the instructions, and wherein the sequence in which the instructions are presented is determined by the portable communication device.

18. The method of claim 11, wherein the step-by-step interactive instruction sequence comprises guidance on calibrating a nondestructive inspection (NDI) device and on inspecting composite damage with the NDI device.

19. The method of claim 11, wherein the transferring the instructions comprises determining the sequence in which the instructions are presented on the portable communication device.

20. The method of claim 11, wherein the step-by-step interactive instruction sequence comprises videos, graphics, and/or illustrations that are viewable by the ramp-side personnel from a display component of the portable communication device.

* * * * *